United States Patent [19]

Wheeler

[11] Patent Number: 5,735,020
[45] Date of Patent: Apr. 7, 1998

[54] COUNTERBALANCE ASSEMBLY

[75] Inventor: Dennis L. Wheeler, Magna, Utah

[73] Assignee: Hercules Incorporated, Wilmington, Del.

[21] Appl. No.: 810,894

[22] Filed: Mar. 5, 1997

Related U.S. Application Data

[63] Continuation of Ser. No. 397,696, Mar. 2, 1995, abandoned, which is a continuation of Ser. No. 336,096, Nov. 7, 1994, abandoned, which is a continuation of Ser. No. 238,858, May 6, 1994, abandoned.

[51] Int. Cl.$^6$ .................................................. E05F 1/00
[52] U.S. Cl. ...................................... 16/198; 160/191
[58] Field of Search ....................... 16/198; 160/189–191

[56] References Cited

U.S. PATENT DOCUMENTS

| | | | |
|---|---|---|---|
| 338,817 | 3/1886 | Ames et al. | 16/198 |
| 928,644 | 7/1909 | Erb | 16/198 |
| 1,827,433 | 10/1931 | Kendall | 160/230 X |
| 2,226,017 | 12/1940 | Pixley | 16/198 |
| 2,314,015 | 3/1943 | Parsons | 16/198 |
| 2,749,570 | 6/1956 | Alder | 16/198 |
| 2,855,162 | 10/1958 | Schact, Jr. | 16/198 |
| 2,932,057 | 4/1960 | Pemberton | 16/198 |
| 3,412,423 | 11/1968 | Binns | 160/191 |
| 3,585,757 | 6/1971 | Ritchie et al. | 244/129.5 X |
| 3,616,575 | 11/1971 | Harris | 49/200 |
| 3,685,567 | 8/1972 | Pemberton et al. | 160/191 |
| 3,921,761 | 11/1975 | Votroubek et al. | 160/191 |
| 4,019,442 | 4/1977 | Lee et al. | 49/200 X |
| 4,447,026 | 5/1984 | Maraghe | 244/129.5 |
| 4,464,216 | 8/1984 | Gardiner | 156/162 |
| 4,601,446 | 7/1986 | Opsahl | 244/129.5 |
| 4,765,602 | 8/1988 | Roeseler | 267/148 |
| 4,817,927 | 4/1989 | Martin | 160/191 |
| 4,852,378 | 8/1989 | Greco | 160/191 |
| 4,882,806 | 11/1989 | Davis | 16/198 |
| 4,930,182 | 6/1990 | Eichenberger | 16/198 |
| 4,981,165 | 1/1991 | Miller et al. | 160/191 |
| 5,064,147 | 11/1991 | Noble et al. | 244/129.5 |
| 5,239,777 | 8/1993 | Husselton | 49/200 |

Primary Examiner—Chuck Mah
Assistant Examiner—Donald M. Gurley
Attorney, Agent, or Firm—Vidas, Arrett & Steinkraus, P.A.

[57] ABSTRACT

The disclosed invention is directed to a torsion spring counterbalance assembly for closures, preferably for aircraft doors, although it is applicable to closures in other environments. The counterbalance system is designed to reduce the total assembly weight by 50% relative to a steel spring assembly. A helical torsion spring is mounted on one or both sides of a support housing, the springs preferably being made of a fiber-reinforced epoxy. Duplicate springs (same part number, wound and loaded in the same direction) may be used on the left and/or the right sides of the assembly to reduce tooling cost and part inventory cost. Operating with duplicate springs is accomplished by placing fixed spring mounting plates for both springs on the left and the rotating end plates for both springs on the right. Both fixed end plates mount to the housing assembly while both rotating end plates mount to the torque output shaft. Similarly, end plates, torque tubes and shock support tubes, bearings, clips, e.g., are common between the right and left side of the assembly.

43 Claims, 14 Drawing Sheets

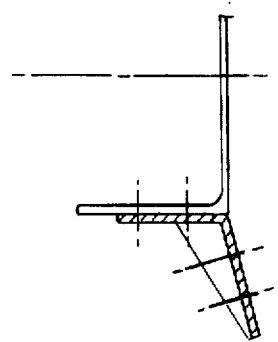
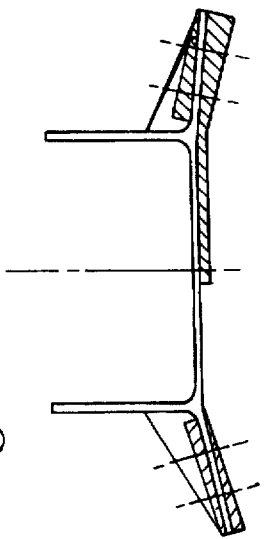
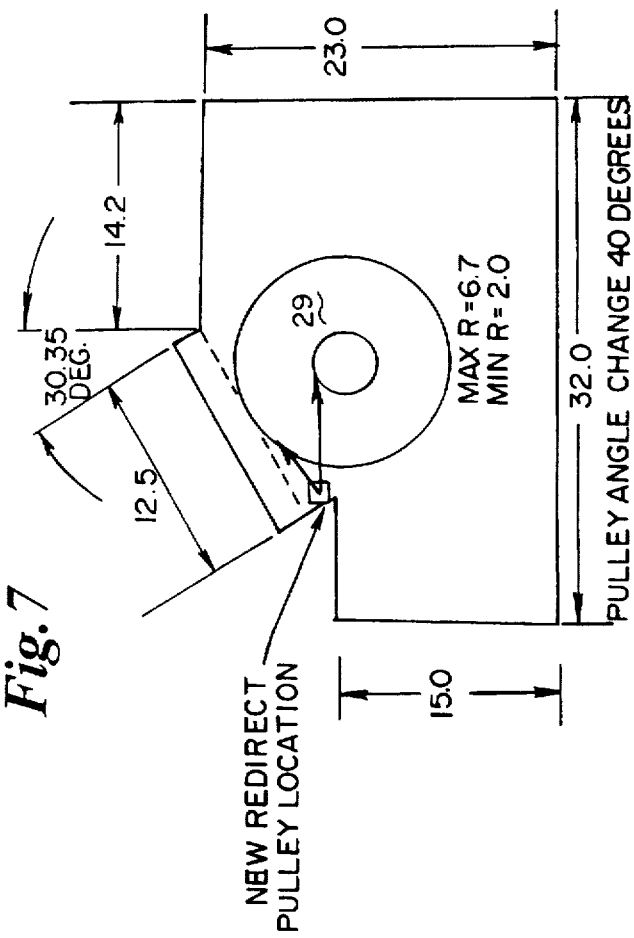

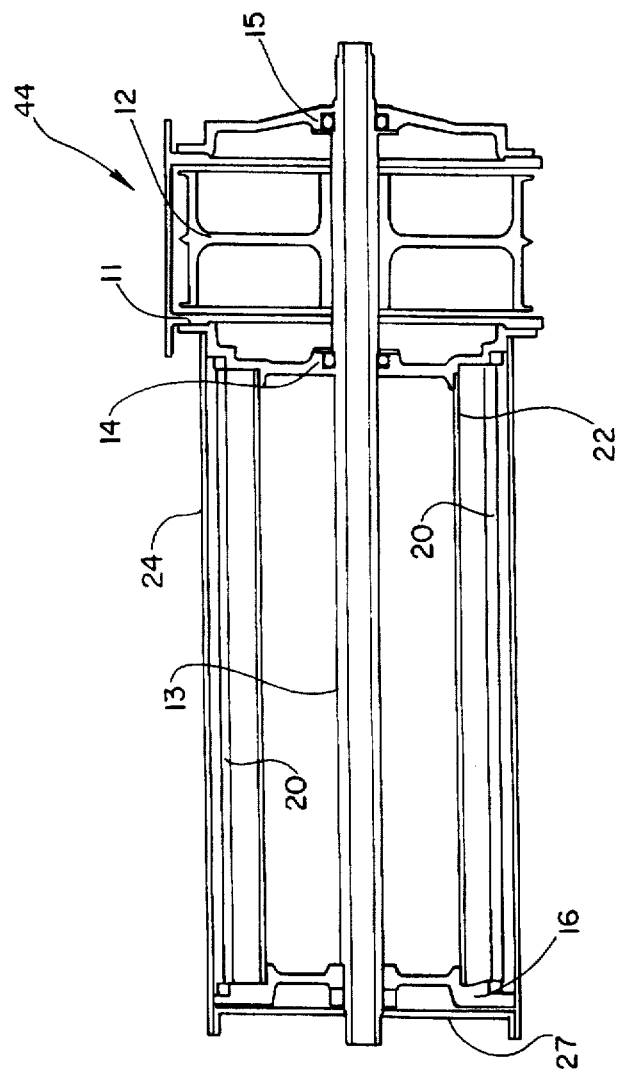

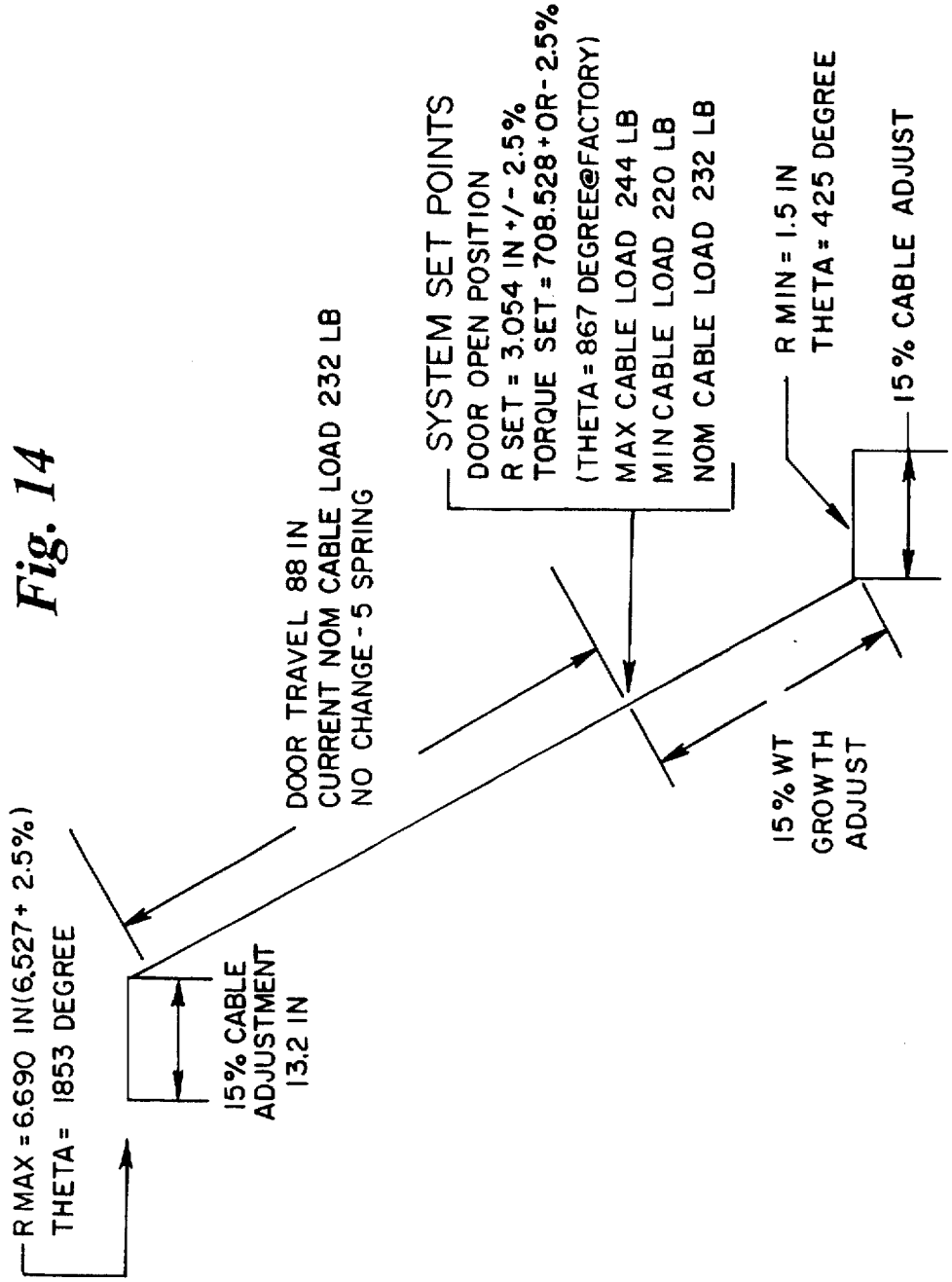

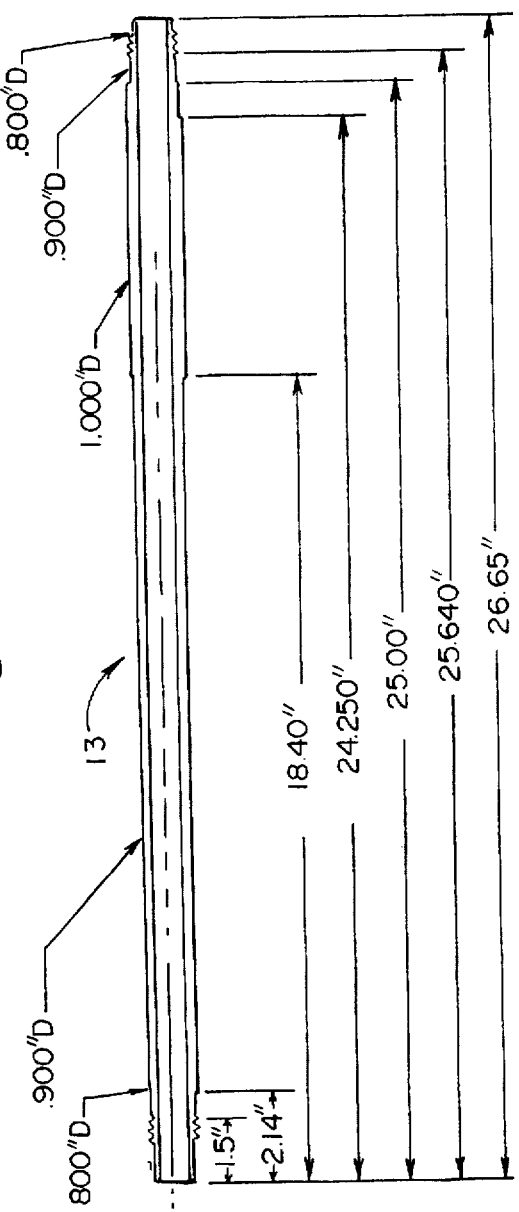

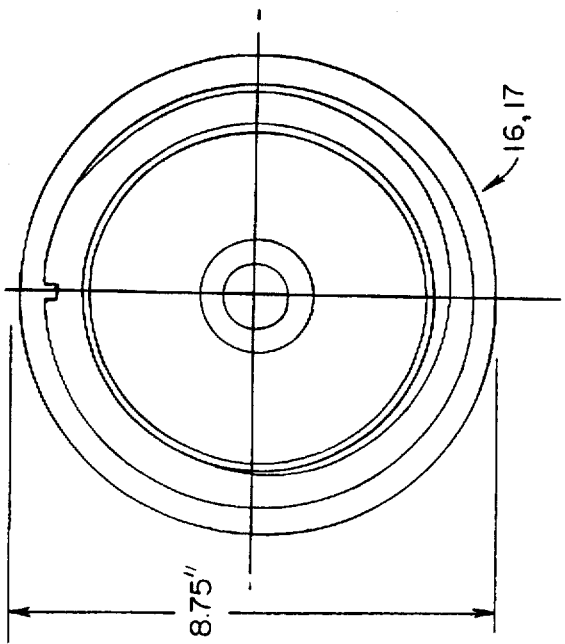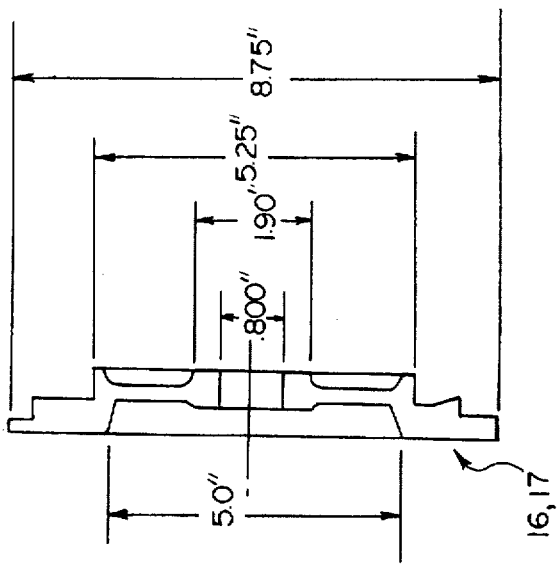

COUNTERBALANCE ASSEMBLY

CROSS-REFERENCE TO RELATED APPLICATIONS

This application is a continuation of application Ser. No. 08/397,696 filed Mar. 2, 1995, now abandoned, which is a continuation of U.S. application Ser. No. 08/336,096, filed on Nov. 7, 1994, now abandoned, which is a continuation of U.S. application Ser. No. 08/238,858 filed on May 6, 1994, now abandoned.

BACKGROUND OF THE INVENTION

1. Field of the Invention

The present invention relates to a counterbalance assembly for doors. In particular, the invention includes a lightweight, low cost, low hysteresis torsion spring counterbalance assembly for aircraft doors and for other applications.

2. Description of Background and Material Information

Counterbalancing doors and other closures by means of one or more springs has been known to those skilled in the art as a practical and advantageous counterbalancing mechanism for such closures.

U.S. Pat. No. 338,817, granted on Mar. 30, 1886, discloses a "Sash Balance" which includes a pair of springs mounted along a common axis for counterbalancing respective sashes of a double hung sash window. As stated therein, a spring is used instead of a weight for counterbalancing each of an upper sash and a lower sash. Thus, each of the two springs in the counterbalancing mechanism act independently of the other. Springs are disclosed as being less expensive than weights and are more easily replaced, if they become defective. As disclosed therein, in the position in which both the upper and lower sashes are lowered, each respective spring is given a torsional stress and the sash is held in any desired position. For tensioning the springs, the pulleys to which the springs are attached are made in complementary rachet sections.

In the aforementioned arrangement, however, if a spring were to break or if a cable which connects a spring to its respective sash were to break, the sash would be unbalanced and would tend to fall downwardly to its closed position.

U.S. Pat. No. 3,616,575, granted on Nov. 2, 1971, and U.S. Pat. No. 4,882,806, granted on Nov. 28, 1989, disclose counterbalancing apparatuses for vertically movable doors, such as doors of walk-in coolers, fire doors or garage doors, which are guided in their movements along rails. With regard to each apparatus disclosed, a pair of oppositely wound torsion springs are mounted along an axis at the upper part of the assembly. Respective right and left hand assemblies are thereby employed in these apparatuses. As the door is opened, tension in the torsion springs is increased to thereby provide a counterbalance to the weight of the respective door, which is connected to the springs by means of cables.

U.S. Pat. No. 3,412,423, granted on Nov. 26, 1968, discloses another counterbalancing apparatus employing a pair of torsion springs for use with an upwardly operated door mounted in the rear of a truck van. An object of the invention therein disclosed is to enable the apparatus to operate, although less advantageously, inspire of the failure of one cable or spring. Both springs are effective to counterbalance the weight of the vehicle door as the door is raised or lowered. Although the springs are positioned along a common axis, they are mounted on respective shafts which are coupled for limited rotation with respect to each other.

During a spring failure as described in the latter-mentioned patent, the spring energy is released and could caused damage. Other than to retain tension in both cables during such failure, no provisions are disclosed for damage prevention. It would appear that damage caused by a broken spring could prevent operation and cause binding of the mechanism, although nothing is disclosed in this patent.

It has also been known to employ fiber reinforced torsion springs in a counterbalancing arrangement. U.S. Pat. No. 4,765,602 (assigned to Boeing) discloses such a spring. A pair of these springs are known to be used in a counterbalance arrangement in the B767 aircraft, although they are not mounted on a common axis and no provision is disclosed for damage prevention. In the realm of fiber reinforced springs, if a spring were to fail, the resin is known to splinter which causes potential problems to persons in the vicinity of the counterbalance arrangement, as well as potential problems associated with surrounding hardware.

U.S. Pat. No. 3,585,757, granted on Jun. 22, 1971, discloses an apparatus for operating an aircraft door. Power-actuated cables are utilized for moving the door, which is roller-mounted on tracks which guide the movement of the door. Counterbalancing by means of a pair of axially aligned oppositely disposed torsion springs is disclosed as providing power assistance in moving the heavy door upwardly and, in the event of a power failure, such counterbalancing permit the door to be opened manually.

U.S. Pat. No. 4,464,216, granted on Aug. 7, 1984, commonly assigned herewith to Hercules, Inc., discloses a composite spring, although not specifically disclosed for counterbalance assemblies. Disclosed is a fiber reinforced composite spiral torsion spring using unidirectional glass and graphite fiber.

U.S. Pat. No. 4,765,602, granted on Aug. 23, 1988, is directed to a fiber reinforced composite helical torsion spring having graphite and aramid fibers encased in a sheath with cross fiber reinforcing fibers. No mention is made of its use or applicability or to counterbalance assemblies.

SUMMARY OF THE INVENTION

An object of the present invention is to provide a new and improved counterbalancing apparatus for closures that is not afflicted with the disadvantages inherent in prior art designs, including the disadvantages mentioned above.

More particularly, the present invention is directed to a lightweight, low cost, low hysteresis counterbalance system which has particular application to aircraft doors and to closures in other environments. The counterbalance system of the invention was designed to reduce the total assembly weight by 50% relative to a steel spring assembly concept.

According to the present invention, helical torsion springs are mounted on one or both sides of a support housing and are preferably fiber-reinforced epoxy in composition. The springs are contemplated to be manufactured as filament wound composite torsion springs.

The support housing is part of a housing assembly. The total counterbalance assembly includes a housing assembly (non-rotating), one or two springs or spring sets and a torque output assembly (rotating). The housing assembly comprises all of the non-rotating components and includes a support housing, bearing end plates, fixed spring end plates, outer torque tubes, dust covers, and mounting lugs. The torque output comprises of all of the rotating components and includes the output shaft, shaft bearings, rotating end plates, and output reel(s), pulley(s), or gear(s). Spring mounting clips and locking devices complete the counterbalance assembly.

Duplicate springs (same part number, wound and loaded in the same direction) may be used on either or both the left and/or the right sides of the assembly to reduce tooling cost and part inventory cost. Conventional counterbalance assemblies use either a two spring nest (one inside the other) or a left and a right spring mirrored pair with both spring fixed end plates in the center and the rotating end plates outboard. Conventional two spring counterbalance systems, therefore require two sets of tooling. The concept in this approach requires only one set of tooling. Operating with duplicate springs is accomplished by placing fixed spring mounting plates for both springs on the left and the rotating end plates for both springs on the right. Both fixed end plates mount to the housing assembly while both rotating end plates mount to the torque output shaft.

This same approach has been used for as many of the assembly parts as possible. End plates, torque tubes and shock support tubes, bearings, clips, etc are to a large extent common between the right and left side of the assembly. This greatly reduces the number of part configurations and consequently reduces greatly the cost of development, production and spares.

A single spring mounted on either side of the support housing may be used for single spring applications using the identical parts. Using standard or common parts lowers cost of development, production, and spares.

Materials have been selected and rough sized for one application. Fiber reinforced torsion springs have been in production for over six years which fit this application.

The aforementioned approach to the present invention results in a unique apparatus compared to known counterbalance assemblies seen so far in the industry. By means of the present invention, fiber reinforced torsion composite springs are made more marketable since the entire counterbalance assembly can now be provided at a significantly lower weight and cost compared to the current industry concepts. The design features of the assembly according to the invention can be determined by visual observation.

The counterbalance apparatus of the invention is contemplated for use in the C-17 military transport aircraft of the Douglas Aircraft Company. However, the counterbalance apparatus of the invention is contemplated to have application to commercial aircraft as well as other applications.

In view of the foregoing, the present invention is considered to be directed to an assembly for counterbalancing a door and to include:

a torque shaft having a predeterminate axially extending length, a first end portion and a second end portion;

an arrangement for supporting the torque shaft for rotation relative to the support housing;

a first rotatable end member mounted for rotation with the torque shaft at the first end portion of the torque shaft;

a second rotatable end member mounted for rotation with the torque shaft at a portion of the torque shaft spaced from the first end portion of the torque shaft;

a cable drum mounted for rotation with the torque shaft;

a cable being operably connected to the cable drum for being moved by movement of the cable drum, the cable also being operably connected to the door for effecting movement of the door upon movement of the cable drum;

a first torsion spring having one end affixed to the first rotatable end member for rotation with the first rotatable end member, the first torsion spring surrounding and extending along a predeterminate length of the torque shaft in a direction away from the first rotatable end member, the first torsion spring having a second end affixed against rotation-with respect to the first rotatable end member; and a second torsion spring having one end affixed to the second rotatable end member for rotation with the second rotatable end member and extending in the axial direction away from the first and second rotatable end members, the second torsion spring having a second end affixed against rotation with respect to the second rotatable end member.

In a preferred embodiment, the second torsion spring extends away from second end portion of the torque shaft so that along a majority of the length of the second torsion spring, between the one end and the second end thereof, the second torsion spring does not surround the torque shaft.

The arrangement for supporting the torque shaft for rotation preferably comprises bearing supports and a support housing, whereby the bearing supports are fixedly connected to the support housing.

More particularly, the bearing supports comprise first and second bearing support end members, the torque shaft extending through the bearing support end members, the first torsion spring being positioned between the first rotatable end member and the first bearing support end member, the second rotatable end member being positioned between the second bearing support end member and the second torsion spring.

According to the invention, the first torsion spring and the second torsion spring are interchangeable, the first rotatable end member and the second rotatable end member are interchangeable, and the first bearing support end member and the second bearing support end member are interchangeable.

According to another aspect of invention, each of the first torsion spring and the second torsion spring includes a low-friction coating for minimizing hysteresis loss.

Another aspect of the invention includes a fixed end member and means for connecting the fixed end member to the second bearing support, wherein the second end of the second torsion spring is affixed to the fixed end member and the second end of the first torsion spring is affixed to the first bearing support end member.

According to another aspect of the invention, a first outer tube encircles the first torsion spring and wherein the means for connecting the fixed end member to the second bearing support comprises a second outer tube encircling the second torsion spring.

According to yet a further aspect of the invention, a first inner tube encircles the torque shaft, the first torsion spring encircling the first inner tube, and a second inner tube is provided, whereby the second torsion spring encircles the second inner tube. Each of the first inner tube and the second inner tube comprises means for limiting transverse displacements of the first torsion spring and the second torsion spring, respectively, upon predeterminate forces being exerted to the assembly, particularly in the event that the assembly is mounted within an aircraft, whereby the springs are prevented from disadvantageous effects from high "G" or crash loads.

Further according to more particular aspects of the invention, the first inner tube comprises one end fixedly mounted to the arrangement for supporting the torque shaft, whereby the first inner tube is fixed against rotation, and a second end is slidingly engageable with a mechanical stop of the first rotatable end member; and the second inner tube comprises one end fixedly mounted with respect to the arrangement for supporting the torque shaft, whereby the second inner tube is fixed against rotation, and a second end is slidingly engageable with a mechanical stop of the second rotatable end member.

Preferably according to the invention, the first outer tube and the second outer tube are interchangeable and the first inner tube and the second inner tube are interchangeable.

Further, according to a preferred embodiment of the invention, each of the first and second outer tubes and the first and second inner tubes comprises a fiber-reinforced epoxy for minimizing weight of the assembly.

Still further according to a further aspect of the invention, an end cap mounted at an end of the first outer tube and an end cap mounted at the second outer tube, whereby the first torsion spring and the second torsion spring are enclosed between respective inner and outer tubes and, on outwardly extending ends, by the end caps. These end caps are also preferably made of a fiber-reinforced epoxy for minimizing weight of the assembly.

In accordance with a preferred embodiment of the invention, the cable drum comprises a cable reel, whereby the cable is wound upon the reel and one end of the cable is affixed to the reel. According to a preferred embodiment, the cable reel has a flared groove for receiving the cable wound thereupon.

Further according to a particular aspect of the invention, the cable drum is positioned between the first bearing support and the second bearing support and between the first torsion spring and the second torsion spring.

As mentioned above, the assembly is to be used for a closure, preferably a door, whereby the invention is thereby considered to additionally include the door as well as a guiding arrangement for guiding movement of the door between a lowered, closed position and a raised, open position, wherein the door is connected tot he cable drum via the cable.

According to the assembly including the door, the cable is connected to the cable drum for being wound upon the drum for increasing tension in each of the first torsion spring and the second torsion spring as the door is moved in a direction toward the closed position.

According to another aspect of the assembly including the door, the cable drum is positioned generally centrally between the first bearing support and the second bearing support and between the first torsion spring and the second torsion spring, and the assembly further comprises pulleys for redirecting the cable from the centrally positioned cable drum to a laterally displaced connection point on the door.

Still further, the invention includes an aspect whereby the assembly is to be considered to include a kit of parts, whereby a single spring counterbalancing assembly can be easily converted to a dual spring assembly, whereby the two springs are axially aligned and duplicate parts, such as a duplicate spring as well as rotatable and fixed end plates, are used.

Other objects and advantages of the invention are to be found in the description and claims which follow.

BRIEF DESCRIPTION OF THE DRAWINGS

The above and additional objects, characteristics, and advantages of the present invention will become apparent in the following detailed description of preferred embodiments, with reference to the accompanying drawings which are presented as non-limiting examples, in which:

FIG. 7 schematically illustrates the envelope within which an embodiment of the assembly is contained;

FIG. 8 illustrates a portion of a mounting bracket for the assembly of the invention, showing a first option for mounting the assembly to an aircraft;

FIG. 9 illustrates a portion of a mounting bracket for the assembly of the invention, showing a second option for mounting the assembly to an aircraft;

FIG. 10 illustrates a portion of a mounting bracket for the assembly of the invention, showing a third option for mounting the assembly to an aircraft;

FIG. 13 is a side elevation view, in longitudinal cross-section, of a single spring counterbalancing assembly according to the invention;

FIG. 14 schematically illustrates torque and cable settings in a particular contemplated installation of the assembly according to the invention.

FIG. 15a is a side elevation view of the torque shaft of the assembly according to the invention, in longitudinal cross-section;

FIG. 15b is an end elevation view of the torque shaft of FIG. 15a;

FIG. 16b is a side elevation view of the stationary end plate of FIG. 16a;

FIG. 17a is a side elevation view of a rotatable end plate of an embodiment according to the invention;

FIG. 17b is an end elevation view of the rotatable end plate of FIG. 17a;

FIG. 18b is an end elevation view of the right bearing support of FIG. 18a;

FIG. 19b is a side elevation view of the left bearing support of FIG. 19a.

DETAILED DESCRIPTION OF THE PREFERRED EMBODIMENTS

With respect to the drawings, only enough of the construction of the invention has been depicted, to simplify the illustration, as needed for those of ordinary skill in the art to readily understand the underlying principles and concepts of the present invention.

Further, general principles of the present invention will be described in connection with FIGS. 1 and 2, and further details of embodiments of the invention will thereafter be described in connection with FIGS. 3–19.

Figure 1:
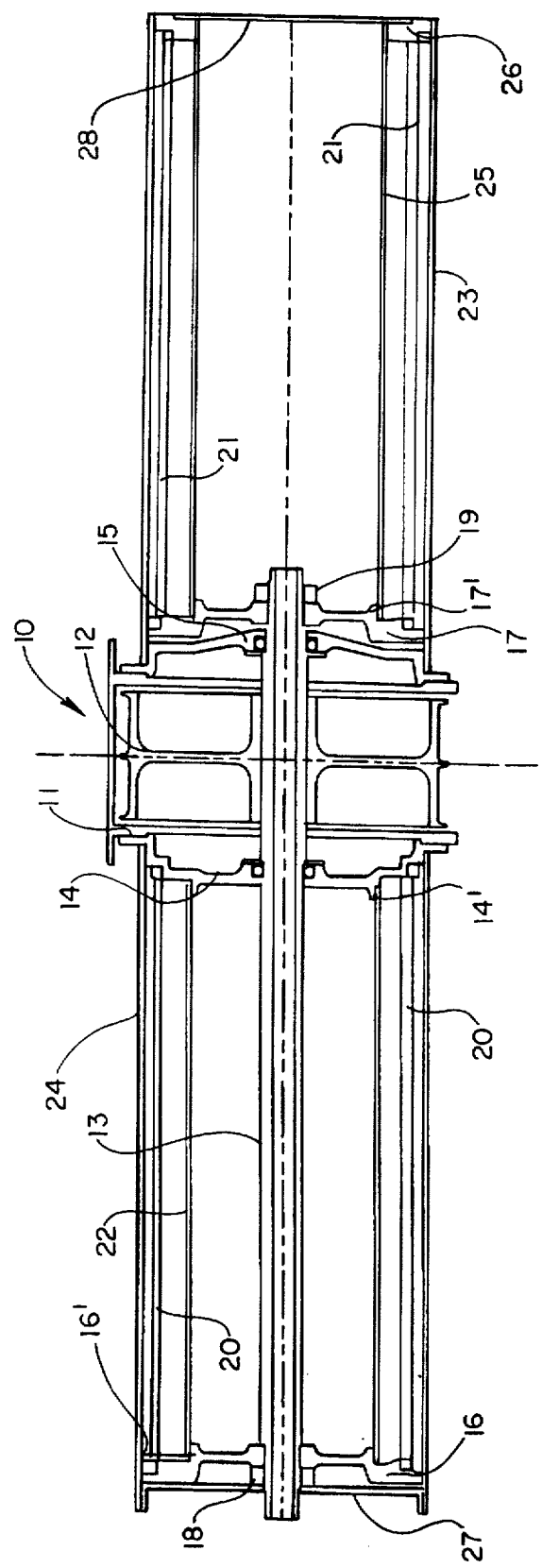
FIG. 1 is a side elevation view, in longitudinal cross-section, of a dual spring counterbalancing assembly according to the invention.

FIG. 1 illustrates a double spring counterbalancing assembly 10 according to the invention. In the embodiment shown, a support housing 11 provides for the assembly, including support for a cable drum or reel 12. In a preferred embodiment, a suitable cable is wound upon the reel 12, from which the cable is suitably trained toward its connections with the door to be counterbalanced. Preferably, two separate cables each have an end affixed to the cable reel and each cable is trained to a respective part of the door. It is also contemplated that a cable drum could take the form of a friction drum, for example, whereby one or more turns of a cable, wound upon yet a further reel, e.g., provides a friction drive for the cable. In this regard, U.S. Pat. No. 3,585,757, granted on Jun. 22, 1971, described above, is hereby expressly incorporated by reference in its entirety for its disclosure of the manner in which a counterbalancing assembly can be connected to an aircraft door or closure.

A torque shaft 13 extends longitudinally from the left in FIG. 1, through the cable reel 12, to which it is secured for rotation, by any known manner, such as complementary splines, for example, is mounted for rotation in a left bearing support/fixed end member or plate 14 and a right bearing support/fixed end member or plate 15. The bearing support members 14, 15 are fixedly mounted to the support housing 11. Ball bearings, or other suitable bearings, are in supporting engagement with the torque shaft 13, the cable reel 12 being fixedly mounted to the torque shaft for rotation therewith between the bearing end members 14, 15.

At the left of the assembly 10 a rotatable end member or plate 16 is fixed upon the torque shaft 13 for rotation with the shaft as it is cause to rotate by means of tension applied to the cable, thereby rotating the cable reel 12. To the right of the cable reel 12 and to the right of the bearing support 15 is a second rotatable end member or plate 17. The second rotatable end member 17 is preferably identical to the first rotatable end member 16. Left and right lock washers 18, 19, respectively, are threadably secured upon the torque shaft 13, as shown, to retain it in place.

The dual spring embodiment of FIG. 1 includes a left torsion spring 20 and a right torsion spring 21. One end of the left torsion spring 20 is affixed to the left rotatable end plate 16 and the other end of the left torsion spring 20 is affixed to the left bearing end plate 14. Likewise, one end of the right torsion spring 21 is affixed to the right rotatable end plate 17 and the other end of the right torsion spring 21 is affixed to a right fixed end plate 26.

By means of a right side torque tube 23 the fixed end plate 26 is fixedly mounted with respect to the support housing 11. That is, the outer or torque tube 23, which encircles the right torsion spring 21, is fixed on the right side to the fixed end plate 26 and is fixed on the left side to the right bearing support 15, the right bearing support 15 being fixedly connected to the support housing 11.

With regard to components of the assembly 10 which have been described thus far, it will be understood that the following components are rotatable in response to movement of the cable that is wound upon the reel 12, or in response to movement caused by a torsional movement in the springs 20, 21 (the remaining components remaining relatively fixed): reel 12, torque shaft 13, left rotatable end plate 16 and right rotatable end plate 17. More particularly, as the door is moved downwardly toward a closed position, e.g., the cable is paid out and the reel 12 is thereby turned. The turning of the reel causes the rotation of torque shaft 13 and the consequential rotation of end plates 16, 17. As the end plates 16, 17 are rotated, the tension in the torsion springs 20, 21 is increased, since respective ends of the springs are affixed to the end plates 16, 17, and the tensioning of the torsion springs is effective to store potential energy in the form of a counterbalancing force which is effective in assisting the movement of the door to the open position.

Figure 2:
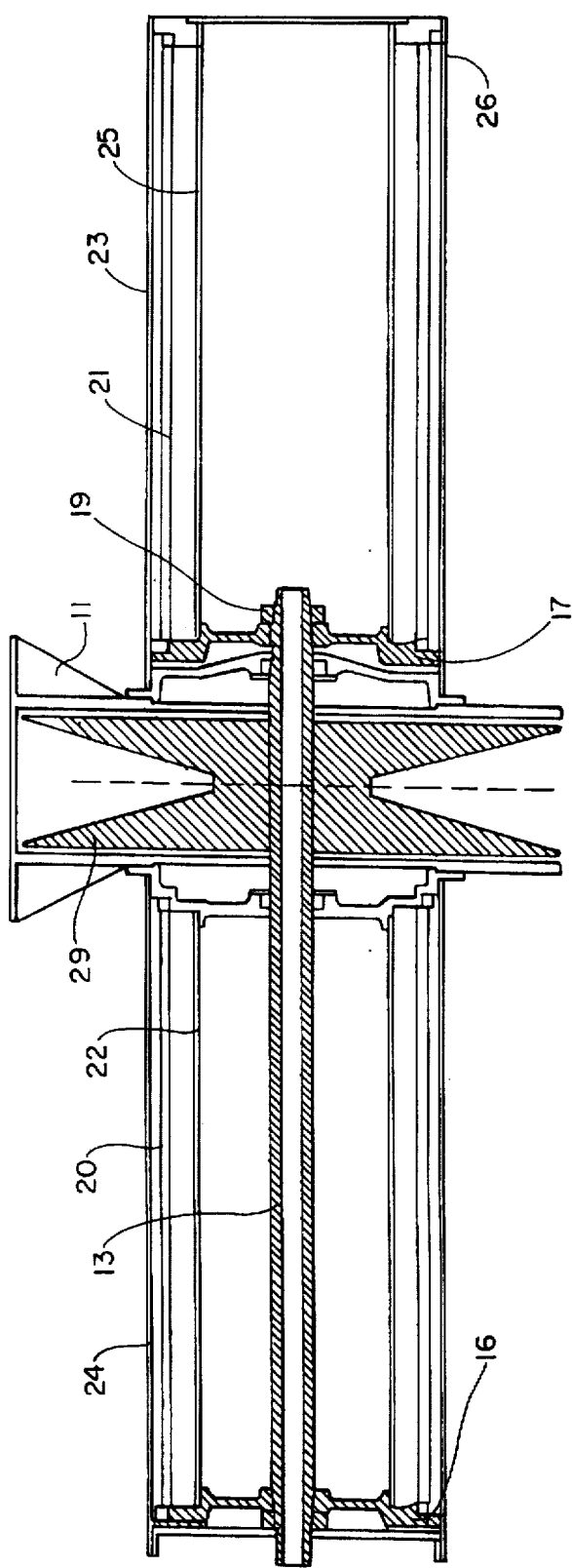
FIG. 2 is a side elevation view, in longitudinal cross-section, of a double spring counterbalancing assembly according to the invention using a grooved cable drum.

FIG. 2, which illustrates an embodiment having a grooved cable reel 29, shows the rotatable components in darkened lines. Other than the cable reel 29, the assembly components are the same as those described in connection with FIG. 1. In the embodiment described above with respect to FIGS. 1, a constant diameter cable drum or reel is employed, whereby the cable load varies linearly with spring rotation and is proportional to spring torque. By employing a grooved cable reel, as shown in FIG. 2, however, whereby the diameter of the reel is varied, the cable load can be made to be substantially constant.

Although the invention can been practiced by manufacturing the various components of the assembly from steel and other compositions, in a preferred embodiment, the torsion springs 20, 21 and many of the other components are made of a composite fiber reinforced epoxy composition to reduce the weight of the assembly. Springs like that disclosed in the aforementioned, U.S. Pat. No. 4,765,602 could be utilized. For this purpose, therefore, U.S. Pat. No. 4,765,602 is hereby expressly incorporated by reference in its entirety.

Reduction of weight is important, for example, for aircraft door assemblies. Certain components are provided in the assembly for containing the torsion springs within a confined space to prevent problems that might arise in the event that one of the composite springs 20, 21 were to fail. For example, if a spring were to break, particularly when it is in a torsioned, i.e., wound configuration, such breaking is possibly accompanied by fracturing, including splintering of the helically extending spring wire. Therefore, it has been found that encasing the springs within a confined area, as described immediately following, is advantageous.

In the preceding description, torque tube 23 has been mentioned as transferring forces from the fixed end, i.e., the right end of the second spring 21 to the support housing 11. The torque tube 23 additionally performs the function of part of the aforementioned containment arrangement for the spring 21. The containment arrangement is further comprised of an inner tube 25, whereby the inner tube extends along the inner periphery of the torsion spring 21 and extends longitudinally from the right fixed end plate 26, with which the inner tube 25 is fixed, to the right rotatable end plate 17. The left end of the inner tube 25 merely rides upon the end plate 17 as the end plate 17 rotates. Additionally, a right cover plate 28 closes the right end of the assembly although, in the illustrated embodiment, the spring 21 is contained at the right end by means of the end plate 26.

Similarly, on the left side of the assembly a torque tube 24 encircles the left torsion spring 20 and extends from the left bearing support or fixed end plate 14 to a left cover plate 27. The left cover plate 27 includes a centrally located opening through which the left end of the torque shaft 13 extends. As described, the left torque tube 24 thereby performs the function of part of a containment arrangement for the spring 20. The left side containment arrangement is further comprised of an inner tube 22 which extends along the inner periphery of the torsion spring 20 and extends longitudinally from the left bearing support or fixed end plate 14, with which the inner tube 22 is fixed, to the left rotatable end plate 16. The left end of the inner tube 22 merely rides upon the end plate 16 as the end plate 16 rotates.

The inner and outer containment tubes, or cylinders, are designed to withstand any single component failure. By design, all failure mechanisms for all components have a higher reliability than the springs. This is accomplished by using an "A" basis allowable strength levels with factors of safety equal to or greater than the 1.5 used for the springs. In the inner and outer containment cylinders are designed to handle the energy release created by a spring failure.

Since the reel is solid or is comprised of bolted halves and two cables are preferably connected to it, if one cable breaks the other cable instantaneously picks up the remaining door load in a known manner.

As shown in FIGS. 1 and 2, the outer and inner tubes surround the composite springs and enclose all but the reel and pulleys, the pulleys being spaced from the reel for guiding the cables to the door, as will be described in conjunction with a more detailed embodiment, below.

There are three possible failure mechanisms for the springs. A tang or hook is fabricated into the last and the first coil of each spring, i.e., at the ends of the springs. This tang fits inside of a slot or groove in the spring mounting end plates through which torque is applied to the springs. The tang is held in place by a clip, secured over the slot or groove, which assures that it can neither move laterally or climb out of the slot. The tang itself is designed to a 1.6 factor of safety while the spring body is designed to a factor of safety of 1.5. When the springs are loaded, significant radial pressure is placed in the end coils which off-loads the tang. This assures that if a failure were to occur, it would be the spring body and not the tang.

The other two failure mechanisms can only occur within the spring body coils. The spring coils are coiled carved beams which are placed in bending as torque is applied to the spring. Under this condition, the outer surface of the springs are placed in tension and the inner surface is placed in compression. A "C" ring specimen is a portion of an actual spring coil which is loaded to simulate spring torque loading during the testing of each given spring. The diameter is decreased causing the outside surface to be placed in tension and the inside surface to be placed in compression. "C" ring specimens taken from over 1,000 springs have failed in either tension (most frequent) or compression (least frequent). Of all the springs which have taken to failure in structural tests, none have exhibited a compression failure mode. A compression failure, if it were to occur, would progress through the entire coil thickness, creating two pieces. The two containment cylinders are designed to contain the energy of a spring as it fails and to prevent damage to personnel during repair or replacement of the assembly. This same approach is used in the B767 counterbalance system.

The more probable failure mechanism of outer surface tension is less severe. The outer layers of fibers reach their strength limit, usually in some minor imperfection, and stop carrying tension load at the failure initiation point. The failed material separates from the spring body in the regions where the resin matrix has failed. The initiated crack between fiber layers may propagate over multiple coil lengths. The result is a partial spring failure with the outer layers stripping back from the failure initiation point. The containment cylinders oft he present invention function to hold these stripped layers. The partially failed spring retains lifting capacity and retains stored energy but at a reduced spring rate which, in effect, lowers the cable load slightly.

None oft he above-mentioned failure mechanisms will cause the assembly to bind. Door movement remains possible, although manual assistance would be necessary. At least 45% of the door weight would be carried by the system. However, upon failure, personnel are not exposed to the contained material due to the presence of the containment cylinders. Such personnel would have to disassemble or replace the assembly which would then contain sharp fragments or splinters of graphite composite.

Prior to installation, it is contemplated that proof testing is to be performed on the assembly. The assembly is thusly loaded to a higher condition than would be expected in its intended environment, such as in an aircraft. The proof test would actually simulate the installation torquing procedure and would over-test the assembly to at least 110% of the expected torque and would assure a high probability of success over the life time of the aircraft, for example.

Materials selected for the various components of the assembly are intended to have little or no degradation relative to the environment in which the assembly is to be operated. Coatings and sealants are applied as necessary to make the environments tolerable over the life of the assembly.

The selected materials account for moisture absorption, operating temperature and fatigue in the worst case material conditions. The required strength limit is, at a minimum, a "B" level. This assures that at least 90% of the failures in the material would occur above this stress level with a 95% confidence level. However, since the springs are designed to an "A" basis strength level, this same strength basis is preferably used for the other assembly components, particularly if there is little weight savings to be gained.

The maximum weight of the assembly is 50 lbs. Application of a 1.5 factor of safety (FS) implies that the assembly must withstand a 75 applied load without permanent deformation while being applied in any direction at any point.

The counterbalance assembly contemplated for use in the Douglas C-17 aircraft includes two spring assemblies, as described above, each weighing approximately 50 lbs., which must be attached to a support fixture.

Cable tension adjustment using turnbuckles only affects the balance between the right and left cables in the door. Once the reel setting is fixed at the factory, during the proof loading operation, there is no need for the three pound adjustment. In the event that a single spring or component failure were to occur in the field, i.e., after installation, provisions are provided such that the reel position to torque setting may be adjusted. An infinite adjustment capability is contemplated, whereby an infinite adjustment capability is possible by setting a self-locking nut which sets the reel to the shaft.

As described above, the preferred embodiment of the counterbalance assembly invention includes a central portion, including a torque shaft 13 to which two spring end plates 16, 17 are attached. The shaft is supported through two bearing assemblies in end plates 14, 15. The bearings are selected to have a minimum of running friction. The springs are kept from dust by end plates 27, 28 which have seals which rub on the shaft. These seals contact the shaft at small radii which minimizes friction. As the springs are torqued, each individual spring coil may rub on the immediately adjacent coil. In the fully torqued condition, the diameter of the spring is smaller and the coils have moved past each other to physically add coils to the spring length. In the fully torqued condition, the spring is in the longest possible state. Under this condition, enough axial tolerance must be provided in the assembly to prevent any significant normal axial force between spring coils. The springs as produced are provided with a Teflon filled paint. This minimizes friction between the coils in the fully torqued condition. In the event that there are waves set up in the spring due to vibration or axial inertial loads, the coils will withstand the small loads thus created.

Figure 3:
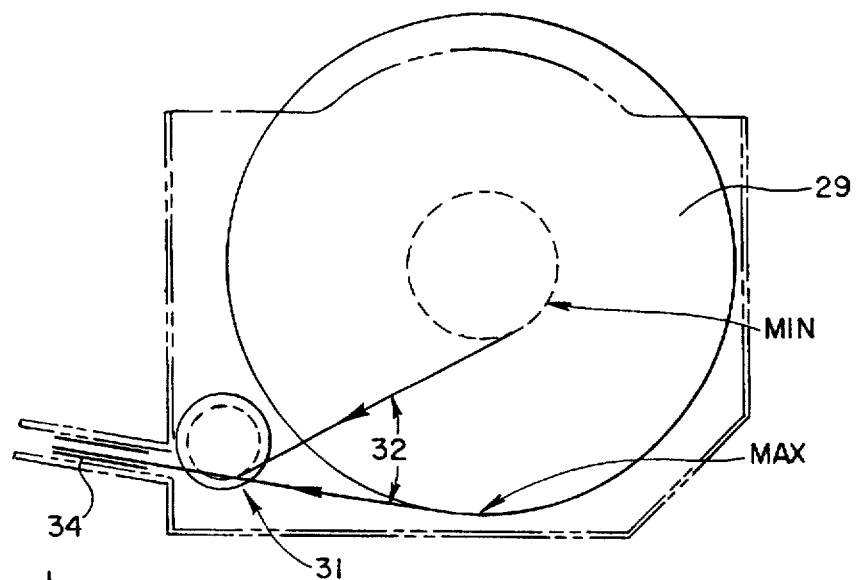
FIG. 3 is a partial top view of an embodiment of the counterbalancing assembly according to the invention, illustrating the cable reel and diverting pulleys.
Figure 4:
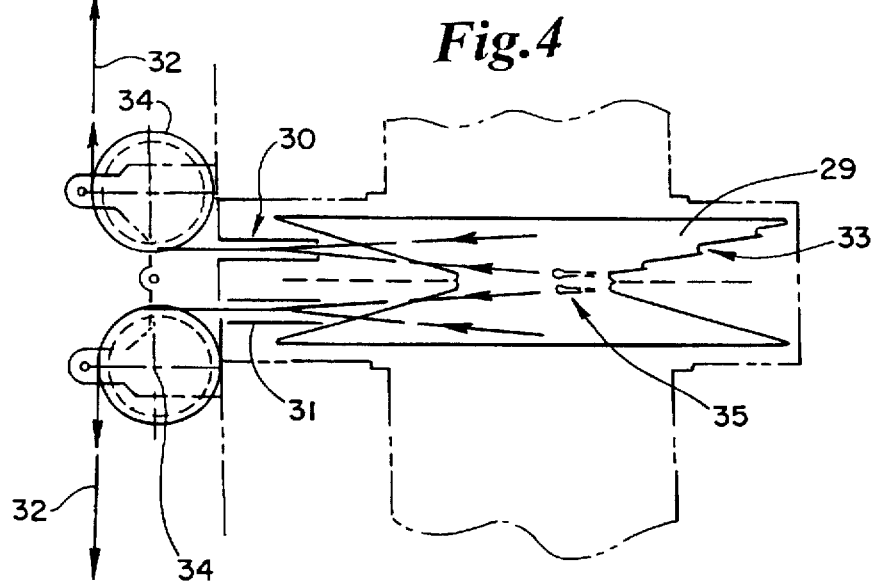
FIG. 4 is an end view of the cable reel and diverting pulleys of FIG. 3.

The incoming pulley locations, such as the locations of pulleys 34, 34, as shown in FIGS. 3 and 4 for directing the cable 32 from the door to the counterbalance assembly 10, to the assembly according to the described embodiment, are identical to a known assembly. Since the preferred embodiment is to have a variable diameter reel 29 for cable take-up, as shown in FIGS. 2, 3 and 4, additional pulley redirects 30, 31 are included in order to prevent chatter and cable abrasion. These pulleys direct the cable 32 for all cable positions on the reel 29. FIG. 3 illustrates the cable position MIN at a minimum radius (when a maximum amount of cable has been paid out) and the cable position MAX at a maximum radius (when a minimum amount of cable has been paid out). The lead or slope of the reel cable grooves 33 and the redirect pulleys are designed such that the cable 32 tracks and does not jump between pick-up stations under vibration and shock conditions. As shown in FIG. 4, the cable ends each have a respective ball 35 which is inserted in a slot in the reel to retain the cables through tension in the cables.

The composite springs, as used in the B767 aircraft, have a service life requirement of 50,000 cycles. During qualification testing for the B767 counterbalance, the springs were cycled through 200,000 simulated door open/close operations at elevated temperatures. After this cycling, the springs were tested to 200% of limit load without failure.

As mentioned above, counterbalance springs of the present invention, for use in the C-17 aircraft, are contemplated as being identical to the B767 springs and it is not contemplated that they are to be allowed to exceed the B767 allowable torque or angular displacement. Under such conditions, the life is greater than or equal to 50,000 cycles. The required life expectancy for the C-17 installation is 34,000 cycles. This yields a minimum margin of safety of 45%. Although this level of safety may appear excessive, it permits the use of existing springs without the need for recertification. This allows the C-17 to have a high reliability.

Figure 5:
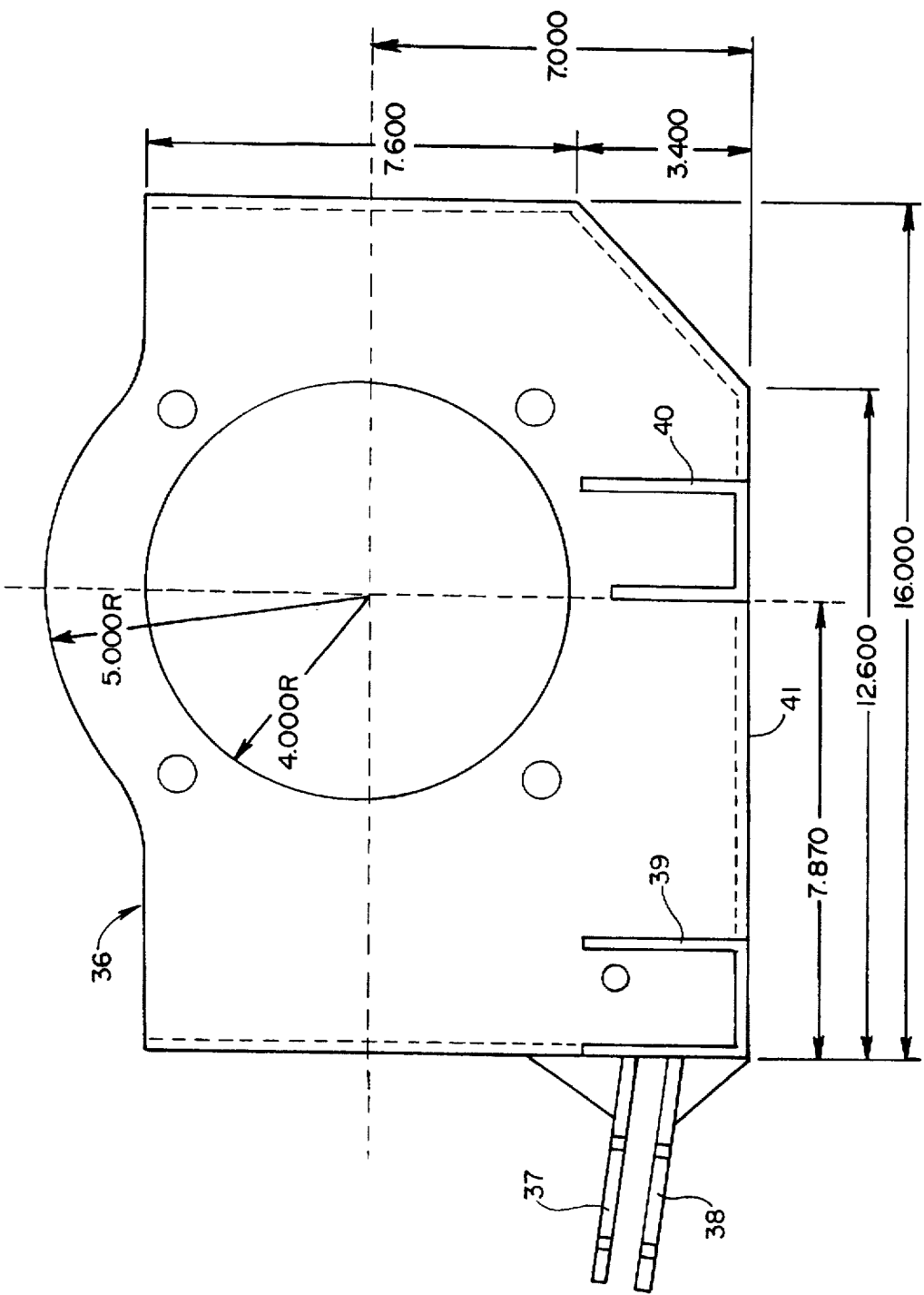
FIG. 5 is an end view of a cable reel of an embodiment of the counterbalancing assembly according to the invention, illustrating spring pre-load features of the assembly.
Figure 6:
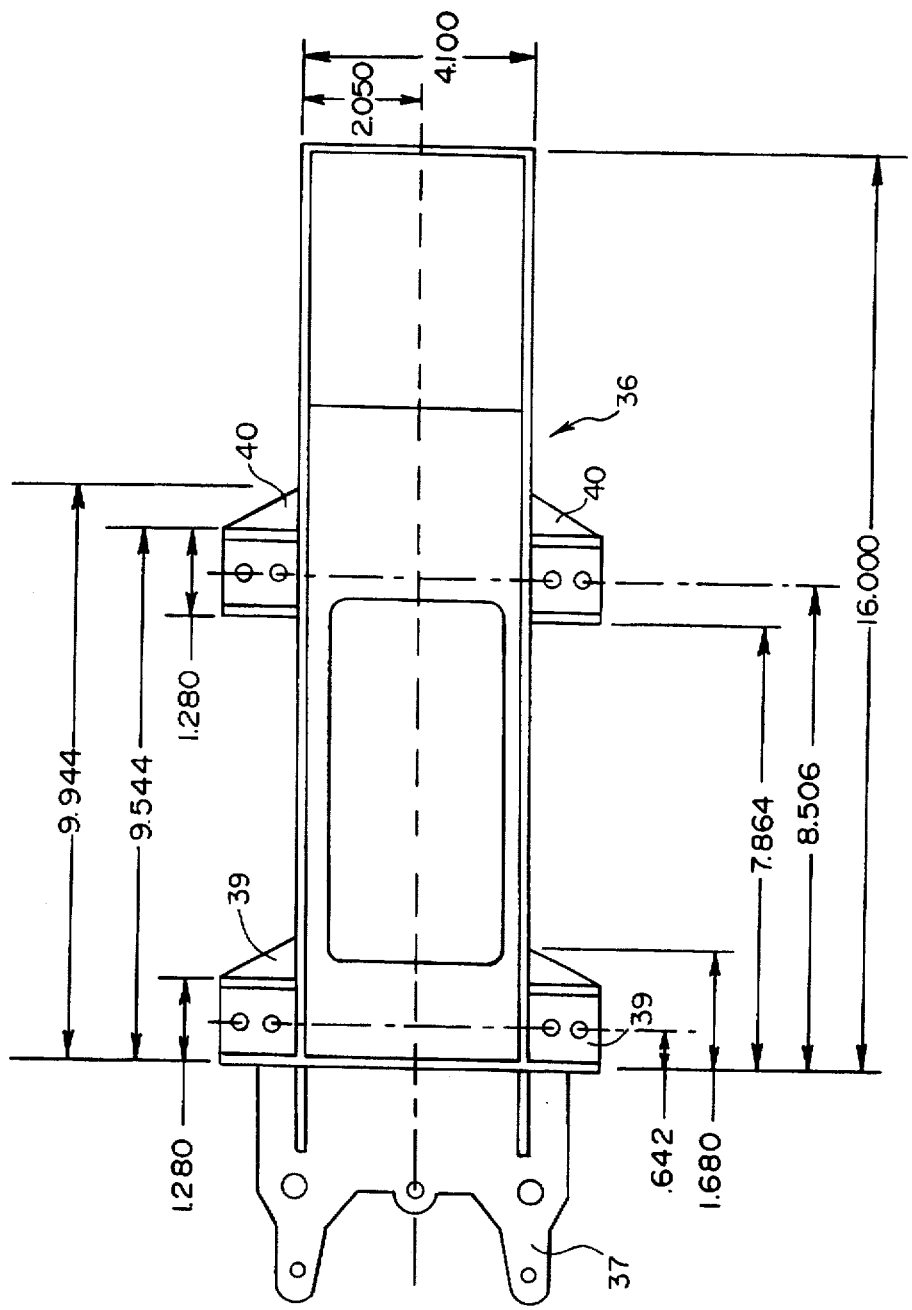
FIG. 6 is a top view of the cable reel and diverting pulleys of FIG. 5.

The reel according to a preferred embodiment requires a variable diameter, as mentioned above, which is larger than the known assembly. The required support bracket 36 to house the reel is shown in FIGS. 5 and 6. As can be seen, the incoming pulley locations, in the form of projecting support members 37, 38, have been maintained. The current aircraft mounting locations and provisions, in the form of protruding portions 39, 40 on either side of the support bracket have also been maintained. The dimensions of the bracket 36 are shown in FIGS. 5 and 6, in inches. Although the invention is contemplated to be used in other forms, i.e., with a support bracket of a differing shape and/or size, the dimensions shown are preferred for the particular installation described herein. With this configuration, the counterbalance assembly according to the invention falls totally within the envelope specified in FIG. 7. Further, the bracket has a flat bottom 41 to permit the same assembly to fit a right hand door or a left hand door in the aircraft within the same envelope allowed.

The mounting bracket for securing the counterbalancing assembly to the aircraft can be variously constructed. Three possible options are contemplated which are the simplest and which are the most weight effective, and are shown in FIGS. 8-10. In short, the only way that a counterbalance assembly can be mounted to either side of the aircraft interchangeably is to have a common base having a flat bottom with some other feature to interface between the support and the existing frame and intercostals.

The first option has a base mounting plate plus four wedge-shaped shims. As seen in FIG. 8, a flat left and right plate is provided containing built-in wedge shims to fit between flat bottomed support and frame and intercostals. Although this option includes merely a one piece interface, it also requires four wedges to maintain mounting parallel surfaces for fastener interfaces.

The second option, as seen in FIG. 9, includes eight wedge-shaped shims, four configurations. Two identical wedge shims are provided for each of four feet, one for each corner of the support. This option provides a lighter weight mounting, although more parts are required. On the other hand, one less part number is required.

The third option, as seen in FIG. 10, includes four angle brackets with gussets, one for each support corner. Each bracket is bolted to the support and to an intercostal. In this option, the brackets are interchangeable with either side. It is the lowest in weight of the options. Further, jig-drilled support/angle bracket assures aircraft interchangeability even if the angle brackets were line-drilled with the intercostals.

The safest and best approach for assembling the counterbalance assembly to the aircraft is described as follows. First, it is preferred that an assembly aid which has the mounting ears pre-attached as described above in the third option, above, is used. This assembly aid is light and may be clamped in position while line-drilling the holes in the ears and the aircraft structure (ring frames and intercostals). The fasteners would then be inserted which mount the ears to the aircraft.

The assembly aid is then removed. This leaves an interchangeable feature permanently in the aircraft to which any counterbalance can be mounted to either side of the aircraft or to any aircraft since the holes in the support bracket and the ears were drilled using controlled tooling.

Next, the assembly is bench torqued. Since the counterbalance must be stored in a non-energized condition, the required system pre-load must be applied to the springs. This is to be done either in the aircraft or off-line. In an off-line condition, the reel indexing may be checked and all safety related issues with torque wrench operations are done on a bench where safety checks can be easily followed and applied. In this pre-loaded condition, the entire assembly can be easily attached to the pre-mounted ears in the aircraft by two people. Finally, the assembly is fastened to the aircraft.

While in the aircraft, any of the following assembly components can be replaced; that is, replacement can be made without the necessity of removing the entire assembly from its mounting position in the aircraft: the torque tubes 23, 24, the dust covers 27, 28, the cables 32, the springs 20, 21, the spool or reel 12 or 29, the bearings 14, 15 (if not press fit; retained by clips) and the torque shaft 13 (if the bearings are removable without damage).

The variable diameter take-up spool 29 is preferred so that the cable load at any door position or any spring rotation position is constant. Under this condition, the cable pick-up point of the spool is at a radius such that the cable load times the pick-up radius is equal to the system torque. The spool has a spiral groove machined therein of sufficient depth to assure that the cables under vibration and shock do not bounce out of the groove.

According to a preferred embodiment, built into the assembly is an additional pulley set located inside the support bracket which directs the cables from pulleys outside the support bracket to the variable diameter spool, as shown in FIG. 3 and 4. The groove in this additional pulley is of sufficient depth and has sloped sides to assure the cable does not chafe or vibrate out of the groove while covering the entire range of positions on the variable diameter spool.

Turnbuckles are contemplated to be provided in the two cables so that, as they are adjusted, the load sharing is adjusted. Either cable will carry the entire load. In the event of one cable breaking, the counterbalance assembly will still hold the door and will operate.

Adjusting the turnbuckles for the variable diameter reel option does not increase the total lifting force. This can only be affected by indexing the reel or cable pick-up radius relative to the system torque (one, two, three or four springs).

The springs used in the counterbalance assembly according to the preferred embodiment of the invention, i.e., using known composite springs, require no matching. Any spring that is acceptable to the predetermined specifications and is within ±5% of the nominal acceptance torque value is acceptable with any other such spring.

Figure 11:
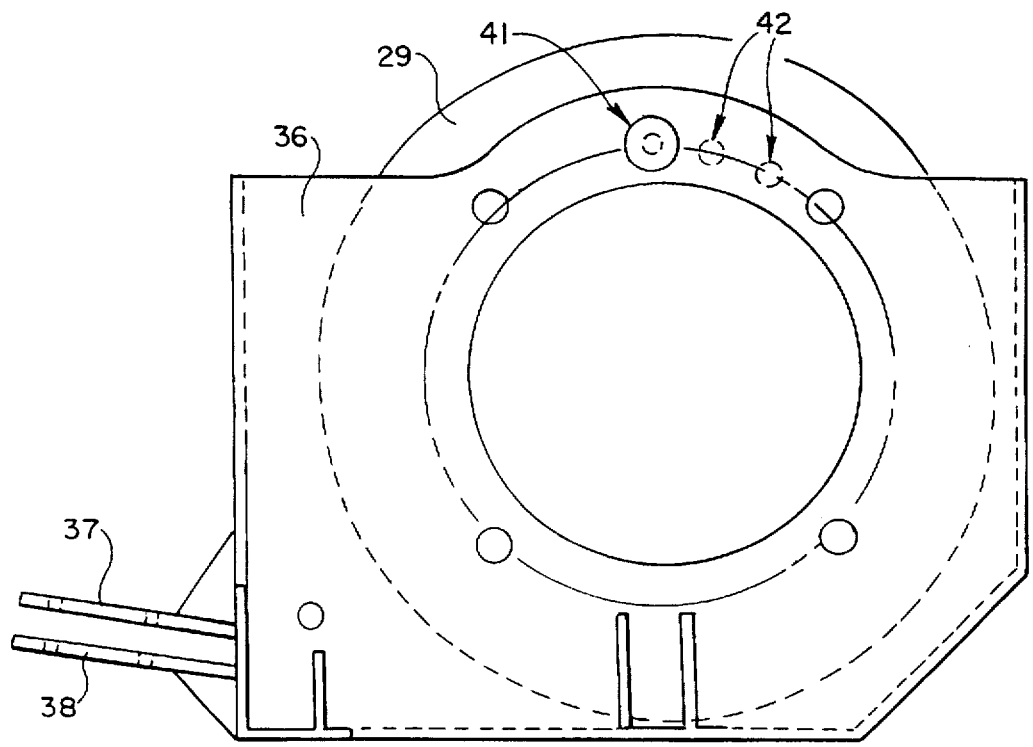
FIG. 11 illustrates a support bracket for the assembly of the invention, in an end elevation view, depicting a pinning interface for use during pre-loading of the springs of the assembly.
Figure 12:
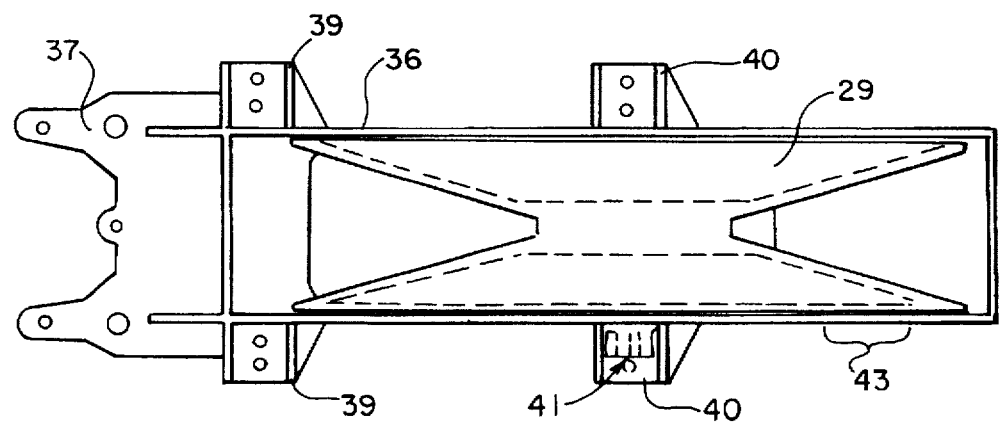
FIG. 12 is a top plan view of the support bracket of FIG. 11.

The support bracket is preferably fitted with a pinning feature, through which a spring locking pin interfaces with holes 42 in a flange 43 in the variable diameter reel as shown in FIG. 11. This same feature could also be provided between the dust cover 27 and the movable spring end plate 16. In either case, a boss 41 is provided of sufficient thickness to prevent pin rotation under pre-load. Each action of a torque wrench, e.g., on the torque shaft 13 tightens the springs 20, 21 while the pin is removed. As the wrench is reversed, the torque is maintained in the assembly by means of the pin, i.e., the pin can be inserted to lock the reel to the support bracket. The holes 42 are provided in the bracket 36 for this purpose and are spaced to give the required setting spacings to reach the desired torque. See FIG. 14 in this regard. In order to have a minimum cable load of 220 lbs. and a maximum load of 244 lbs., the assembly is torqued to within ±2.5% of a nominal 232 lb. cable load. This assumes that the reel attach point of the cable is within ±2.5% of its required radius. The combined effect is a possible ±5% excursion which is the total allowed load range. Since the reel-to-spring setting is intended to be fixed at the factory, the torque setting is the only setting which would remain to be performed, preferably by a torque rachet wrench.

In the environment of an aircraft, the assembly may be pre-loaded either on or off the aircraft. In either case, the locking mechanism is designed to take the torque in the assembly. The pro-loading force is assumed by the torque tube 24 on the left side of the assembly and the torque tube 23 on the right side of the assembly.

In an alternative to the arrangement of the aforementioned "pinning" feature, the system could be provided with a ratchet (i.e., a pawl and sprocket arrangement, e.g.) which slips as the torque wrench applies the pro-load and which holds the assembly pro-load as the wrench is reversed or ratcheted. The pin or the assembly ratchet provide exactly the same function.

The pre-load torque is applied to the assembly in the door up position. The cable load is constant between 220 and 244 lbs. In the event that one cable breaks or slips, the other cable carries out the load and the counterbalance still supplies the total required lift load.

At all times at least 45% of the total load is carried by each spring. This assures that in the event of a single spring failure, the door may be raised manually with a lifting force of less than 100 lbs. The most probable failure mode for a spring is fiber tension in the outside surface. This only reduces the spring constant, leaving a large portion of the lifting load in the assembly. A partially failed spring still functions. As described above, in the event of a spring failure, the failed portions are contained between the two cylinders 22, 24 or 23, 25. Fractured composite is never exposed.

The reel-to-frame assembly and adjustment is done at the factory. This leaves fewer and simpler installation operations at the aircraft assembly line. The assembly, in a ready to install condition, has fewer parts. Both springs are already mounted to the support, the shaft, pulleys and reel are already assembled.

In addition to providing a containment area on the inner side of their respective torsion springs, the inner tubes 22, 25 also provide a means for limiting transverse movement of the torsion springs 20, 21, respectively. That is, torsion springs 20 and 21 are generally massive in diameter and length, but have relatively little resistance to transverse movement. Such movement would tend to be considerable, e.g., in the environment of an aircraft, whereby forces during air turbulence, rough landings or other jolting of the aircraft, e.g., would cause an unrestricted spring to be moved considerably transverse to the longitudinal axis. Further, during pro-loading of the springs, described above, the effective diameter of the torsion springs is reduced. In either case, such transverse movement is limited, however, due to the presence of the inner tubes 22, 25. Inner tube 22 mates with a mechanical stop 16' on the periphery of the left rotatable end plate 16, upon which the inner tube 22 rides in a sliding relationship during rotation of the end plate 16. Similarly, inner tube 25 mates with a mechanical stop 17' on the periphery of the right rotatable end plate 17, upon which the inner tube 25 rides in a sliding relationship during rotation of the end plate 17.

The right end of inner tube 22 is affixed against peripheral stop 14' of the left bearing support end plate 14, whereas the right end of the inner tube 25 is affixed against the inner periphery of the right fixed end plate 26, as shown in FIG. 1.

To reduce tooling cost and part inventory cost, springs 20, 21 are preferably identical, that is, they are wound and loaded in the same direction, thereby permitting any spring to be used on either or both the left and right sides of the assembly. In a manufacturing context, the springs 20, 21 would have same part number.

This same approach is also used for as many of the assembly parts as possible. For example, the rotatable end plates 16, 17 can be made interchangeable, as well as the outer torque tubes 23, 24, the inner shock support tubes 22, 25, the bearing support plates 14, 15, and other components such as various clips, etc. This greatly reduces the number of part configurations and consequently reduces greatly the cost of development, production and spares. Although the right side bearing support plate 15 is shown in FIG. 1 to differ from the left side bearing support plate 14, with respect to the fact that the left side support plate 14 includes a mechanical peripheral stop for engagement with the right end of the torsion spring 20 and a mechanical peripheral stop 14' for engagement with the right end of the inner tube 22, whereas the right side bearing support 15 is not shown to be engageable with the right side torsion spring or right side inner tube, it is contemplated that a bearing support like that of left bearing support 14 could be employed in place of the right bearing support 15. The aforementioned peripheral stops, in that event, i.e., as employed on the right side, would simply not perform the functions performed on the left side.

FIG. 13 illustrates a single side option assembly 44 for counterbalancing a closure according to the invention. By comparing FIGS. 1 and 13, one can recognize that the single side option shares identical components with the dual side option of FIG. 1. In FIG. 13, however, only a single torsion spring, i.e., the left torsion spring 20 is employed, together with the left torque tube 24 and the left inner shock tube 22. The cable drum or reel 12, nevertheless, assumes the same position on the torque shaft 13 as it assumes in the FIG. 1 embodiment, whereby it is affixed to the torque shaft 13 between left and right bearing support fixed end plates 14, 15.

Without the necessity of providing a different torque shaft, i.e., and by utilizing many of the same components employed for the single side option 44 as for the double side option, the single side option can be easily converted into a double side option or embodiment. The necessary additional components can be considered to comprise an adaptor kit for accomplishing such conversion. In particular, such adaptor kit includes a second rotatable end member 17 mounted for rotation with the torque shaft 13 near the right end thereof, i.e., at a portion of the torque shaft spaced from the left end portion thereof. The adaptor kit also includes a second torsion spring 21 having one end to be affixed to the second rotatable end member 17 for rotation therewith, the second torsion spring extending rightwardly, i.e., in an axial direction away from the first and second rotatable end members 16, 17 to a second end to be affixed to end plate 26 and to the torque tube 23, as described previously.

The foregoing description has been directed to certain specific features of the present invention. The following description is directed to more specific details of preferred embodiments of the invention and includes details that are contemplated, for example, in an actual installation.

In Table 1, various components of the assembly according to the invention are listed for one two-spring counterbalancing assembly for installation as a troop door counterbalance assembly in a Douglas C-17 aircraft. The table indicates, for each component, or item, the number thereof required, the material from which the component is made, the weight (in lbs.) which such components contribute to the total assembly, as well as a short description. By means of the present invention, as shown at the bottom of Table 1, the total assembly has a total weight of 49.6 lbs., which is 50.4 lbs. less than an assembly which the present invention is contemplated to replace.

TABLE 1

COMPONENT DESCRIPTION & WEIGHT BREAKDOWN
ONE C-17 COUNTER BALANCE ASSEMBLY

| ITEM | NO REQ | MATERIAL | WEIGHT PER ASSEMBLY | DESCRIPTION |
|---|---|---|---|---|
| Torsion Spring | 2 | Composite | 16.6 | Filament wound. |
| Outer Torque Tube | 2 | Composite | 4.5 | Belt wrapped cut from long tube. |

TABLE 1-continued

COMPONENT DESCRIPTION & WEIGHT BREAKDOWN
ONE C-17 COUNTER BALANCE ASSEMBLY

| ITEM | NO REQ | MATERIAL | WEIGHT PER ASSEMBLY | DESCRIPTION |
|---|---|---|---|---|
| Inner Shock Tube | 2 | Composite | 1.4 | Belt wrapped cut from long tube. |
| Shaft | 1 | Steel | 2.0 | Hollow machined. |
| Dust Cover Left | 1 | Aluminum | 0.2 | Machined |
| Dust Cover Right | 1 | Composite | 0.1 | Cut from plate. |
| Rotating End Plate | 2 | Steel | 4.1 | Machined |
| Fixed End Plate Left | 1 | Steel | 5.1 | Machined |
| Fixed End Plate Right | 1 | Steel | 0.2 | Machined |
| Bearings | 2 | Steel | 0.3 | Standard |
| Retaining Nut | 2 | Steel | 0.3 | Standard |
| Spool-Conical | 1 | Aluminum | 3.5 | Machined |
| Support | 1 | Aluminum | 6.3 | Welded |
| Misc. | N/A | | 5.0 | Pully, cable, turnbuckle, etc. |
| TOTAL WEIGHT PER ASSEMBLY | | | 49.6 | |
| WEIGHT SAVED | | | 50.4 | 50% |

In a known counterbalance assembly, for the Boeing 767, e.g., a significant portion of the door weight is carried by the door guiding track in the raised position of the door. For this reason, a constant diameter cable reel has been adequate. The required cable load goes down as the torque in the springs is decreased with a higher door position. For use in the C-17, however, no appreciable door weight is carried by the track in any position, which requires that the cable load be constant, or substantially constant.

Therefore, a variable diameter take-up reel has been found to be necessary, as shown in FIGS. 2–4, as mentioned above. The cable load must be constant, or at least as constant as possible, over all spring torque values. The radius at which the door cables attaches to the take-up reel must, therefore, by synchronized such that the cable load times the instantaneous attachment radius must be equal to the sum of the torque in both springs. Secondary considerations have been identified which affect the counterbalance function. For example, turnbuckle adjustment may be used to balance the load on each side of the door, although it would not change the total lifting load as it does in the previous assembly for the B767. It simply changes the torque in the springs.

Variable lifting load adjustment for the door is only possible by changing the indexing of the variable diameter reel relative to the torque value in the springs. Such adjustment can be accomplished at the manufacturing site by indexing the reel relative to the springs at a specified torque value for the assembly. If necessary, such adjustment could also be accomplished in the field, i.e., following installation.

When installation in an aircraft is contemplated, it is advantageous to make the assembly interchangeable for both the left and right side of the aircraft. For this purpose, separate left and right mounting plates can be provided which offers a flat mounting surface for the assembly.

In order to satisfy both the door travel of 88 inches and the take-up reel capacity of 113 inches (see FIG. 14), and the normal loads contemplated, the following conditions are intended to be met:

1. The cable load must be maintained constant (L);
2. The instantaneous cable attach radius (r) times the cable load (L) must be equal to the instantaneous combined spring torques (t).

3. As the spring torque-up and torque-down, the cable take-up must be identically 88 inches over all torque and reel adjustment range(s).
4. Any one spring is not to carry more than 55% of the door weight.

From the foregoing requirements or conditions, the following equations can be derived:

$$t = L \cdot r$$

$$t = \Theta \cdot k$$

$$s = \text{integral of } r \cdot d\Theta,$$

whereby:

$\Theta$ is the instantaneous angular reel displacement in radians;

d represents the differentiation of $\Theta$ or r;

r is the instantaneous reel cable attachment radius;

k is the combined or additive spring constants of the two springs;

$\Theta 1$ represents the door closed position; and $\Theta 2$ represents the door opened position.

By substitution, $\Theta \cdot k = L \cdot r$ and $d\Theta = (L/k)d(r)$.

Performing the integration between $\Theta 1$ and $\Theta 2$ or r1 and r2 yields:

$$s = (L/k) \cdot (r1^2 - r2^2)/2$$
$$= (k/L) \cdot (\Theta 2^2 - \Theta 1^2)/2, \text{ whereby}$$

whereby the following substitutions can be made: s=88 inches, and the value of k is taken from the values known for the springs being employed.

Further, the value of $\Theta 2$ or the door closed spring deflection from known springs (Dash 5 and Dash 7 production springs) yields values shown in Table 2, below.

| PARAMETER | DASH NUMBER 5, 6 | DASH NUMBER 7, 8 | COMMENT |
|---|---|---|---|
| | BOEING 767 TORSION SPRINGS | | |
| Door Closed Deflection | 1958 Degree | 1958 Degree | Normal condition. |
| Door Open Deflection | 1022 Degree | 1022 Degree | |
| Torque Range at 1958 Degree | 810 + 75–70 in-lb | 1025 ± 50 in-lb | • Door open torque range.<br>• Population within 5% of mean- FIG. 1. |
| Torque Range at 1022 Degree | 432 ± 50 in-lb | 542 ± 50 in-lb | Door closed torque range. |
| Acceptance Proof Test | 8 Cycles between 1022 and 1958 without any visual signs. | 8 Cycles between 1022 and 1958 without any visual signs. | • Prior to 110% over maximum operating torque static test.<br>• No spring has passed verification tests and failed service. |
| C-Ring Strength Verification | 3 Each at 160° F./Dry >220 Ksi. | 3 Each at 160° F./Dry >220 Ksi. | • No failures <220 since process improvement.<br>• Current "A" strength 249.0 Ksi.<br>• Current "B" strength 265.8 Ksi.<br>• N = 1142.<br>• Tension and compression failure modes exhibited. |
| Perioidic Verification Test @ % of Max Operating Load | ≧160% (200% Stop) | ≧160% (200% Stop) | • 1/100 Spring sampling rate.<br>• 1 Min hold every 60 degrees.<br>• All springs have broken above 171%.<br>• 160% used relative to 150% requirement to account for 160° F. operating temperature requirement.<br>• No compression failure modes exhibited. |
| Life Cycles | ≧50,000 (200,000 Max) | ≧50,000 (200,000 Max) | Qual test stopped at 200,000 cycles, then tested to 200% limit load witout failure. |
| Ultimate = Max | FS = 1.5 Coils | FS = 1.5 Coils | • All failures must |

-continued

BOEING 767 TORSION SPRINGS

| PARAMETER | DASH NUMBER 5, 6 | DASH NUMBER 7, 8 | COMMENT |
|---|---|---|---|
| Operating Load X Factor of Safety (FS) | FS = 1.6 Tang | FS = 1.6 Tang | occur ≧ ultimate load.<br>• Tang never sees the specified load in service due to torquing frictino on end plates.<br>• No spring tang failure mechanisms observed. |
| Modulus Average | 19.28 Msi | 19.28 Msi | AS4/4502 Fiber/Resin |
| Mean Diameter | 8.42 in (5)<br>13.26 in (6) | 8.42 in (7)<br>13.26 in (8) | |
| Coil Thickness<br>Nominal | 0.3562 in (5)<br>0.3590 in (6) | 0.3865 in (7)<br>0.3895 in (8) | Thickness programmed into winding. |
| Mean Width | 0.3573 in (5)<br>0.3572 in (6) | 0.3575 in (7)<br>0.3575 in (8) | Mandrel groove slight taper. |
| Active Coils | 38 (5)<br>25 (6) | 38 (7)<br>25 (6) | • 5 and 7 use identical mandrels.<br>• 6 and 8 use identical mandrels. |
| Active Length | 1,005.2 in (5)<br>1,041.4 in (6) | 1,005.2 in (7)<br>1,041.4 in (8) | N*Pi*D<br>N = Active Coils |
| Area Moment Inertia | 1.346E-3 in 4 (5)<br>1.377E-3 in 4 (6) | 1.720E-3 in 4 (7)<br>1.760E-3 in 4 (8) | (w*t 3)/12 |
| Max Operating Stress- at 1958 Degree Average Spring Constant | 109.0 Ksi (5)<br>106.2 Ksi (6) | 118.8 Ksi (7)<br>115.7 Ksi (8) | • "A" C-ring strength currently same on all springs.<br>• 5, 6 springs may be torqued to 2133 degrees to same stress. |
| Max Weight (1% Growth Tolerance | 8.0055 lb (5)<br>8.4995 lb (6) | 8.6356 lb (7)<br>9.1634 lb (8) | Including paint and diametric coatings. |

The value Θ2 is the maximum operating rotation allowed in known currently produced springs. Dash 5 and Dash 7 springs are used because they are smaller in diameter and have the same spring constants as Dash 6 and Dash 8 springs, respectively. The smaller diameter permits the use of smaller diameter spring attachments to the counterbalance assembly which minimize weight. Dash 6 and Dash 8 springs may still be used in the event that the contemplated axial envelope is exceeded without loss of function.

Table 2 illustrates the resulting application of the composite torsion springs used for the aforementioned B767 installation in the C-17 installation. As can be seen, the minimum weight configuration utilizes Dash 5 springs with no change from the current production. The maximum operating rotation of the B767 assembly is not exceeded and the current springs comply with a 50,000 cycle life which exceeds the required 34,000 for the C-17. This life expectancy is expected to be maintained, giving the C-17 a significant life margin, because the operations loads and displacements of the B767 assembly are not exceeded in the C-17 counterbalance assembly. Further, because the maximum operational torques and displacements of the springs are not exceeded in the present invention, compared to the known B767 assembly, the reliability of the springs is not expected to change.

Table 3 provides data for the invention as contemplated for the C-17 aircraft and comparisons are shown therein with the known B767 assembly.

TABLE 3

| | REQUIREMENTS | | COMMENT |
|---|---|---|---|
| Item | Min | Max | Average |
| C-17 COUNTERBALANCE | | | |
| Load | 220 lb | 244 lb | 232 lb |
| Travel | 88 in | 88 in | 88 in |
| Reel Capacity | 113 in | 113 in | 113 in |
| Load Growth | +15% | +15% | +15% |
| Over Torque | +15% | +15% | +15% |
| SPRINGS DESIGN TRADE | | | |
| | -5 Spring | -7 Spring | Current Production Springs |
| Min Cable Attach Radius | 1.5000 in | 1.500 in | |
| Max Cable Attach Radius | 6.690 in | 7.530 in | |
| Reel Capacity | 129.8 in | 129.8 in | Required for 15% Cable Adjust. Plus 15% Load Growth |
| Two Spring Weight | 16.001 lb | 17.271 lb | Including Paint & Dielectric Coatings |
| Min Spring Rotation at Door Open | 425 Degree | 332 Degree | |
| Max Spring Rotation at Door Closed | 1853 | 1628 | Current Door Weight |

TABLE 3-continued

| REQUIREMENTS | | | COMMENT |
|---|---|---|---|
| Item | Min | Max | Average |
| "A" Basis System Spring Rate | ±2.5% | +2.5% | 2 Random springs in one assembly narrow distribution of total assembly relative to distribution of single spring. |
| MARGINS RELATIVE TO BOEING SPRINGS | | | |
| Max Spring Rotation Required for C-17 Door Carry | 0.0 | +5.0% | Relative to 767 Torquing and In-service Operations. |
| Service Life Design Cycles | +45% | +45% | Boeing service life 50,000 (qualification test went to 200,000 cycles + 200% limit load without failure). C-17 Life 34,000 |
| Strength | +5.9% | +11.6% | "A" Basis allowable increased because of process improvements and increased data base. |

FIGS. 15a, 15b through FIGS. 19a, 19b illustrate certain components according to a preferred embodiment of the counterbalance assembly described above according to a preferred embodiment. Therein, specific dimensions are given for a proposed installation as described above. Different sizes and shapes are contemplated and are within the scope of the present invention, as presented in the foregoing description.

In particular, FIG. 15a is a side elevation view of a torque shaft 13, e.g., FIG. 15b being an end elevation view thereof.

Figure 16B:
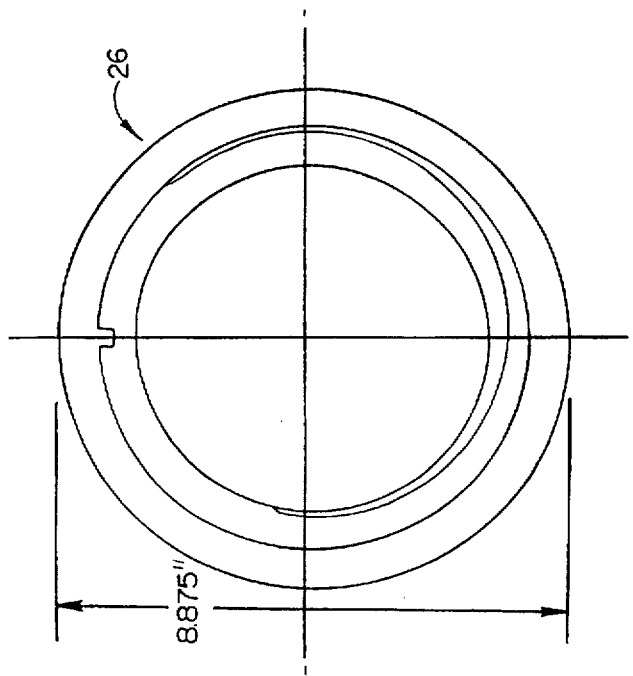
Figure 16A:
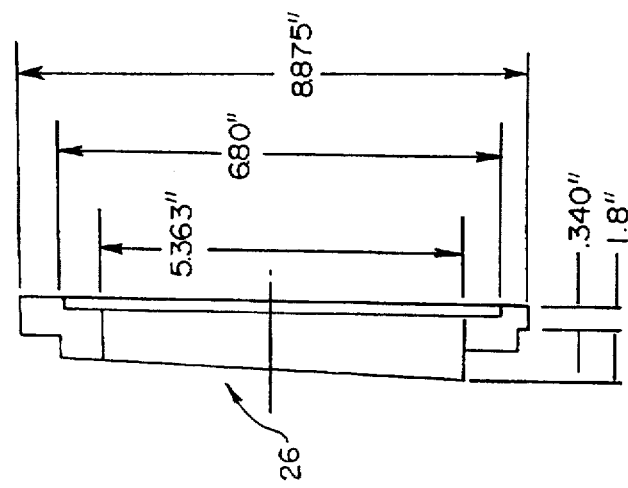
FIG. 16a is an end elevation view of a stationary end plate of an embodiment according to the invention.

FIG. 16a is an end elevation view of a stationary end plate 26, e.g., of an embodiment according to the invention, FIG. 16b being a side elevation view thereof.

FIG. 17a is a side elevation view of a rotatable end plate 16 or 17, e.g., of an embodiment according to the invention, FIG. 17b being an end elevation view thereof.

Figure 18A:
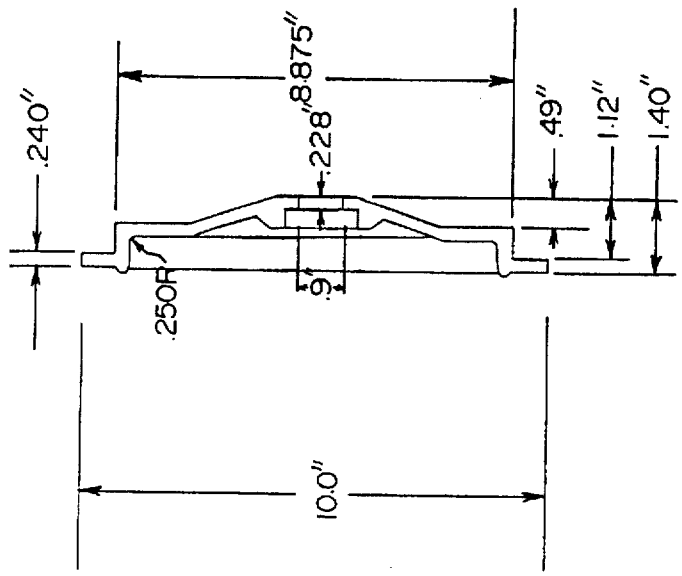
FIG. 18a is a side elevation view of a right bearing support for the torque shaft according to an embodiment of the invention.
Figure 18B:
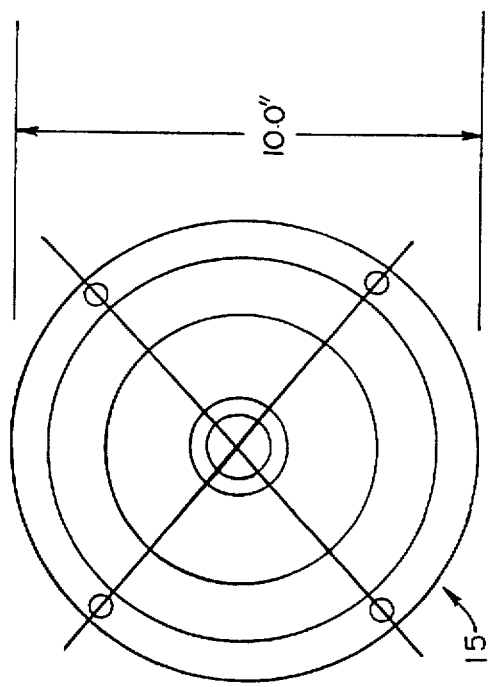

FIG. 18a is a side elevation view of a right bearing support 15, e.g., for the torque shaft according to an embodiment of the invention, FIG. 18b being an end elevation view thereof.

Figure 19B:
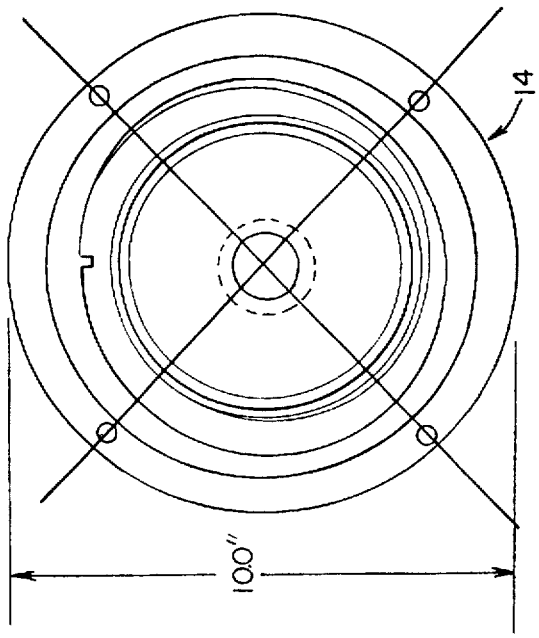
Figure 19A:
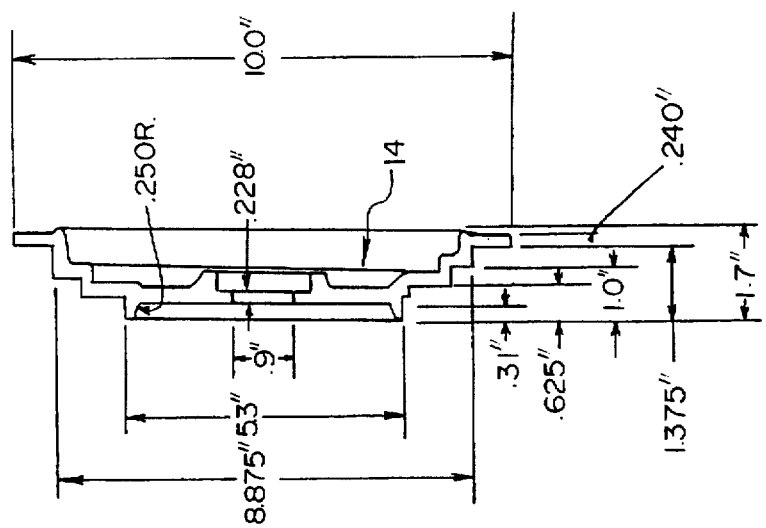
FIG. 19a is a side elevation view of a left bearing support for the torque shaft according to an embodiment of the invention.

FIG. 19a is a side elevation view of a left bearing support 14, e.g., for the torque shaft according to an embodiment of the invention, FIG. 19b being a side elevation view thereof.

Finally, although the invention has been described with reference of particular means, materials and embodiments, it is to be understood that the invention is not limited to the particulars disclosed and extends to all equivalents within the scope of the claims. Further, unless otherwise noted, the invention can be practiced in the absence of any element not specifically disclosed herein or recited in any of the following claims.

What is claimed:

1. An assembly for counterbalancing a door, said assembly comprising:

a one piece torque shaft having a predeterminate axially extending length, a first end portion and a second end portion;

an arrangement supporting said torque shaft for rotation relative to said arrangement;

a first rotatable end member mounted for rotation with said torque shaft at said first end portion of said torque shaft;

a second rotatable end member mounted for rotation with said torque shaft at a portion of said torque shaft spaced from said first end portion of said torque shaft;

a cable drum mounted for rotation with said torque shaft;

a cable being operably connected to said cable drum for being moved by movement of said cable drum, said cable also being operably connected to the door for effecting movement of said door upon movement of said cable drum;

a first torsion spring having one end affixed to said first rotatable end member for rotation with said first rotatable end member, said first torsion spring surrounding and extending along a predeterminate length of said torque shaft in a direction away from said first rotatable end member and toward said second end portion of said torque shaft, said first torsion spring having a second end affixed against rotation with respect to said first rotatable end member by attachment to said arrangement for supporting said torque shaft for rotation; and a second torsion spring having one end affixed to said second rotatable end member for rotation with said second rotatable end member and extending in said axial direction away from said first and second rotatable end members, said second torsion spring having a second end affixed against rotation with respect to said second rotatable end member by attachment to said arrangement for supporting said torque shaft for rotation.

2. An assembly according to claim 1, wherein:

said second torsion spring extends away from second end portion of said torque shaft so that along a majority of the length of said second torsion spring, between said one end and said second end thereof, said second torsion spring does not surround said torque shaft.

3. An assembly according to claim 1, wherein:

said first rotatable end member is a first rotatable end plate and said second rotatable end member is a second rotatable end plate.

4. An assembly according to claim 1, wherein:

said arrangement for supporting said torque shaft for rotation comprises bearing supports.

5. An assembly according to claim 4, wherein:

said arrangement for supporting said torque shaft for rotation further comprises a support housing; and said bearing supports are fixedly connected to said support housing.

6. An assembly according to claim 4, wherein:

said bearing supports comprise:

a first bearing support end member, said torque shaft extending through said first bearing support end member, said first torsion spring being positioned between said first rotatable end member and said first bearing support end member; and a second bearing support end member, said torque shaft extending through said second bearing support end member, said second rotatable end member being positioned between said second bearing support end member and said second torsion spring.

7. An assembly according to claim 6, wherein:

said first bearing support end member and said second bearing support end member are identical.

8. An assembly according to claim 6, wherein said arrangement for supporting said torque shaft for rotation further comprises:

a fixed end member; and means for connecting said fixed end member to said second bearing support;

and wherein:

said second end of second torsion spring is affixed to said fixed end member; and said second end of said first torsion spring is affixed to said first bearing support end member.

9. An assembly according to claim 8, further comprising:

a first outer tube encircling said first torsion spring and wherein:

said means for connecting said fixed end member to said second bearing support comprises a second outer tube encircling said second torsion spring.

10. An assembly according to claim 9, further comprising:

a first inner tube encircling said torque shaft, said first torsion spring encircling said first inner tube; and a second inner tube, said second torsion spring encircling said second inner tube.

11. An assembly according to claim 10, wherein:

each of said first inner tube and said second inner tube comprises means for limiting transverse displacements of said first torsion spring and said second torsion spring, respectively, upon predeterminate forces being exerted to said assembly.

12. An assembly according to claim 11, wherein:

said first inner tube comprises one end fixedly mounted to said arrangement for supporting said torque shaft, whereby said first inner tube is fixed against rotation, and a second end is slidingly engageable with a mechanical stop of said first rotatable end member; and said second inner tube comprises one end fixedly mounted with respect to said arrangement for supporting said torque shaft, whereby said second inner tube is fixed against rotation, and a second end is slidingly engageable with a mechanical stop of said second rotatable end member.

13. An assembly according to claim 10, wherein:

said first outer tube and said second outer tube are interchangeable; and said first inner tube and said second inner tube are interchangeable.

14. An assembly according to claim 13, wherein:

each of said first and second outer tubes and said first and second inner tubes comprises a fiber-reinforced epoxy for minimizing weight of said assembly.

15. An assembly according to claim 13, further comprising:

an end cap mounted at an end of said first outer tube and an end cap mounted at said second outer tube, whereby said first torsion spring and said second torsion spring are enclosed between respective inner and outer tubes and, on outwardly extending ends, by said end caps.

16. An assembly according to claim 15, wherein: each of said end caps comprises a fiber-reinforced epoxy for minimizing weight of said assembly.

17. An assembly according to claim 1, wherein:

said cable drum comprises a cable reel; and said cable is wound upon said reel and one end of said cable is affixed to said reel.

18. An assembly according to claim 17, wherein: said cable reel having a flared groove for receiving said cable wound upon said cable reel.

19. An assembly according to claim 1, wherein:

said cable drum is positioned between said first bearing support and said second bearing support and between said first torsion spring and said second torsion spring.

20. An assembly according to claim 1, further comprising:

a door;

a guiding arrangement for guiding movement of said door between a lowered, closed position and a raised, open position; and wherein said door is connected to said cable drum via said cable.

21. An assembly according to claim 20, wherein:

said cable is connected to said cable drum for being wound upon said drum for increasing tension in each of said first torsion spring and said second torsion spring as said door is moved in a direction toward said closed position.

22. An assembly according to claim 1, wherein:

said first torsion spring and said second torsion spring are identical and are helically wound, as positioned in said assembly, in the same direction.

23. An assembly according to claim 1, wherein:

said first torsion spring and said second torsion spring are identical; and said first rotatable end member and said second rotatable end member are identical.

24. An assembly according to claim 20, wherein:

said arrangement for supporting said torque shaft for rotation comprises:

a first bearing support, said torque shaft extending through said first bearing support; and a second bearing support, said torque shaft extending through said second bearing support;

said cable drum is positioned generally centrally between said first bearing support and said second bearing support and between said first torsion spring and said second torsion spring;

said assembly further comprises pulleys for redirecting said cable from said centrally positioned cable drum to a laterally displaced connection point on said door.

25. An assembly according to claim 1, wherein:

each of said first torsion spring and said second torsion spring comprises a fiber-reinforced epoxy for minimizing weight of said assembly.

26. An assembly according to claim 1, wherein:

each of said first torsion spring and said second torsion spring includes a low-friction coating for minimizing hysteresis loss.

27. The assembly according to claim 1 wherein:

said cable drum comprises a cable reel, said cable reel having a variable diameter; and said cable is wound upon said reel and one end of said cable is affixed to said reel.

28. The assembly according to claim 1 further comprising:

a second cable being operably connected to said cable drum for being moved by movement of said cable drum, said second cable also being operably connected to the door for effecting movement of said door upon movement of said cable drum.

29. An assembly for counterbalancing a door, said assembly comprising:

a torque shaft having a predeterminate axially extending length, a first end portion and a second end portion;

an arrangement supporting said torque shaft for rotation relative to said arrangement, said arrangement comprising bearing supports and a support housing, said bearing supports being fixedly connected to said support housing, said bearing supports comprising a first bearing support end member and a second bearing support end member, said torque shaft extending through said first and second bearing support end members;

a first rotatable end member mounted for rotation with said torque shaft at said first end portion of said torque shaft;

a second rotatable end member mounted for rotation with said torque shaft at a portion of said torque shaft spaced from said first end portion of said torque shaft;

a cable drum mounted for rotation with said torque shaft;

a cable being operably connected to said cable drum for being moved by movement of said cable drum, said cable also being operably connected to the door for effecting movement of said door upon movement of said cable drum;

a first torsion spring having one end affixed to said first rotatable end member for rotation with said first rotatable end member, said first torsion spring surrounding and extending along a predeterminate length of said torque shaft in a direction away from said first rotatable end member, said first torsion spring having a second end affixed against rotation with respect to said first rotatable end member by attachment to said arrangement for supporting said torque shaft for rotation;

a second torsion spring having one end affixed to said second rotatable end member for rotation with said second rotatable end member and extending in said axial direction away from said first and second rotatable end members, said second torsion spring having a second end affixed against rotation with respect to said second rotatable end member by attachment to said arrangement for supporting said torque shaft for rotation, said second rotatable end member being positioned between said second bearing support end member and said second torsion spring;

a first outer tube encircling said first torsion spring;

a fixed end member;

a second outer tube encircling said second torsion spring and connecting said fixed end member to said second bearing support, wherein said second end of said second torsion spring is affixed to said fixed end member and wherein said second end of said first torsion spring is affixed to said first bearing support end member;

a first inner tube encircling said torque shaft, said first torsion spring encircling said first inner tube; and a second inner tube, said second torsion spring encircling said second inner tube;

wherein:
said first outer tube and said second outer tube are identical;
said first inner tube and said second inner tube are identical;
said first torsion spring and said second torsion spring are identical;
said first rotatable end member and said second rotatable end member are identical; and
said first bearing support end member and said second bearing support end member are identical.

30. An assembly according to claim 29, wherein:
said first torsion spring and said second torsion spring are helically wound, as positioned in said assembly, in the same direction.

31. An assembly according to claim 29, wherein:
said cable drum is positioned generally centrally between said first bearing support and said second bearing support and between said first torsion spring and said second torsion spring.

32. An assembly for counterbalancing a door, said assembly comprising:
a spring counterbalancing assembly, said spring counterbalancing assembly comprising:
a one piece torque shaft having a predeterminate axially extending length, a first end portion and a second end portion;
an arrangement supporting said torque shaft for rotation relative to said arrangement;
a first rotatable end member mounted for rotation with said torque shaft at said first end portion of said torque shaft;
a cable drum mounted for rotation with said torque shaft along a portion of said torque shaft spaced from said first end portion of said torque shaft;
a cable being operably connected to said cable drum for being moved by movement of said cable drum, said cable also being operably connected to the door for effecting movement of said door upon movement of said cable drum; and
a first torsion spring having one end affixed to said first rotatable end member for rotation with said first rotatable end member, said first torsion spring surrounding and extending along a predeterminate length of said torque shaft in a direction away from said first rotatable end member and toward said second end portion of said torque shaft, said first torsion spring having a second end affixed to said arrangement for supporting said torque shaft for rotation affixing said second end against rotation with respect to said first rotatable end member.

33. An assembly according to claim 32, further comprising:
an adaptor kit for converting said spring counterbalancing assembly to a dual spring counterbalancing assembly, said adaptor kit comprising:
a second rotatable end member mounted for rotation with said torque shaft at a portion of said torque shaft spaced from said first end portion of said torque shaft;
a second torsion spring having one end for affixation to said second rotatable end member for rotation with said second rotatable end member and extending in said axial direction away from said first and second rotatable end members, said second torsion spring having a second end for affixation against rotation with respect to said second rotatable end member, said second torsion spring being identical to said first torsion spring;
a fixed end member;
means for connecting said fixed end member to said arrangement for supporting said torque shaft for rotation;
and wherein said second end of said second torsion spring is adapted to be affixed to said fixed end member.

34. An assembly according to claim 33, wherein:
said arrangement for supporting said torque shaft for rotation comprises a first bearing support and a support housing; and said first bearing support is fixedly connected to said support housing.

35. An assembly according to claim 34, wherein:

said arrangement for supporting said torque shaft for rotation further comprises a first bearing support end member, said torque shaft extending through said first bearing support end member, said first torsion spring being positioned between said first rotatable end member and said first bearing support end member;

said adaptor kit further comprises a second bearing support end member, said torque shaft being adapted to extend through said second bearing support end member, said second rotatable end member being adapted to be positioned between said second bearing support end member and said second torsion spring; and said first bearing support end member and said second bearing support end member are identical.

36. An assembly according to claim 35, wherein:

said spring counterbalancing assembly further comprises a first outer tube encircling said first torsion spring; and wherein said means for connecting said fixed end member to said arrangement for supporting said torque shaft for rotation of said adaptor kit comprises a second outer tube adapted to encircle said second torsion spring.

37. An assembly according to claim 36, wherein:

said first outer tube and said second outer tube are identical.

38. An assembly for counterbalancing a door as said door moves between open and closed positions, said assembly comprising:

counterbalancing means, said counterbalancing means comprising:

a one piece torque shaft having a predeterminate axially extending length;

a housing supporting said torque shaft for rotation relative to said housing;

a rotatable end member mounted for rotation with said torque shaft;

a torsion spring having one end affixed to said rotatable end member for rotation with said rotatable end member, said torsion spring surrounding and extending along a predeterminate length of said torque shaft, said torsion spring having a second end affixed against rotation with respect to said first rotatable end member by attachment to said housing;

a cable reel mounted for rotation with said torque shaft;

a cable being operably connected to said cable reel for being moved by movement of said cable reel, said cable also being operably connected to said door for effecting movement of said door upon movement of said cable reel, said cable bearing a cable load;

said counterbalancing means being constructed and arranged such for applying substantially constant load to said cable as said door moves between said open and closed positions.

39. The assembly of claim 38 wherein said cable reel has a variable diameter.

40. The assembly of claim 39 wherein said cable reel includes a spiral helix groove with a variable diameter which varies such that as the torque of said spring changes as said door moves between the open and closed position, the diameter of said cable reel changes at an attachment point where said cable leaves said cable reel so that said cable load is substantially constant.

41. An assembly for counterbalancing a door, said assembly comprising:

a one piece torque shaft having a predeterminate axially extending length;

a housing supporting said torque shaft for rotation relative to said housing;

a first rotatable end member mounted for rotation with said torque shaft;

a first torsion spring having one end affixed to said rotatable end member for rotation with said first rotatable end member, said first torsion spring surrounding and extending along a predeterminate length of said torque shaft, said first torsion spring having a second end affixed against rotation with respect to said first rotatable end member by attachment to said housing;

a second rotatable end member mounted for rotation with said torque shaft;

a second torsion spring having one end affixed to said second rotatable end member for rotation with said second rotatable end member, said second torsion spring having a second end affixed against rotation with respect to said second rotatable end member by attachment to said housing;

a cable drum mounted for rotation with said torque shaft;

a cable being operably connected to said cable drum for being moved by movement of said cable drum, said cable also being operably connected to said door for effecting movement of said door upon movement of said cable drum, said cable bearing a load and said cable drum having means being constructed and arranged for applying a substantially constant load to said cable as said door moves between said open and closed positions.

42. The assembly of claim 41 wherein said cable drum has a variable diameter.

43. The assembly of claim 42 wherein said cable drum includes a spiral helix groove with a variable diameter which varies such that as the torque of the springs changes as said door moves between said open and closed position, the diameter of said drum changes at an attachment point where said cable leaves said drum so that said cable load is substantially constant.

* * * * *